(12) United States Patent
Petronelli et al.

(10) Patent No.: US 8,621,505 B2
(45) Date of Patent: Dec. 31, 2013

(54) METHOD AND SYSTEM FOR CLOSED CAPTION PROCESSING

(75) Inventors: Anthony Petronelli, San Jose, CA (US); Steven Gemelos, San Jose, CA (US); Raghvendra G. Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1103 days.

(21) Appl. No.: 12/059,567

(22) Filed: Mar. 31, 2008

(65) Prior Publication Data
US 2009/0244372 A1    Oct. 1, 2009

(51) Int. Cl.
*H04N 7/10*     (2006.01)
*H04N 5/445*    (2011.01)
*H04N 7/173*    (2011.01)
*H04N 21/00*    (2011.01)

(52) U.S. Cl.
USPC ............... 725/32; 725/40; 725/86; 348/465

(58) Field of Classification Search
USPC ............................. 348/465; 725/32
See application file for complete search history.

(56) References Cited

U.S. PATENT DOCUMENTS

| | | | | |
|---|---|---|---|---|
| 5,880,732 A * | 3/1999 | Tryding | ........................ | 715/810 |
| 6,097,441 A * | 8/2000 | Allport | ........................ | 348/552 |
| 6,130,722 A * | 10/2000 | Bae et al. | ..................... | 348/589 |
| 6,748,375 B1 * | 6/2004 | Wong et al. | ........................... | 1/1 |
| 7,075,587 B2 * | 7/2006 | Lee | ................................. | 348/563 |
| 7,130,790 B1 * | 10/2006 | Flanagan et al. | .................. | 704/2 |
| 7,221,405 B2 * | 5/2007 | Basson et al. | ................. | 348/468 |
| 7,571,455 B2 * | 8/2009 | Lee | ................................. | 725/109 |
| 7,580,005 B1 * | 8/2009 | Palin | .............................. | 345/1.1 |
| 2002/0122136 A1 * | 9/2002 | Safadi et al. | .................. | 348/465 |
| 2003/0151621 A1 * | 8/2003 | McEvilly et al. | ............. | 345/744 |
| 2004/0008277 A1 * | 1/2004 | Nagaishi et al. | ............. | 348/468 |
| 2005/0075857 A1 * | 4/2005 | Elcock et al. | ..................... | 704/2 |
| 2005/0137958 A1 * | 6/2005 | Huber et al. | .................... | 705/37 |
| 2005/0162551 A1 * | 7/2005 | Baker | ........................... | 348/468 |
| 2007/0003230 A1 * | 1/2007 | Cho | ................................. | 386/95 |
| 2007/0252913 A1 * | 11/2007 | Minobe | ........................ | 348/465 |
| 2008/0066138 A1 * | 3/2008 | Bishop et al. | ................. | 725/137 |
| 2009/0193474 A1 * | 7/2009 | Stein | .............................. | 725/82 |
| 2009/0207305 A1 * | 8/2009 | Fujita et al. | .................... | 348/468 |
| 2010/0106482 A1 * | 4/2010 | Hardacker et al. | ................ | 704/3 |
| 2010/0289947 A1 * | 11/2010 | Okuda et al. | .................. | 348/468 |
| 2011/0164673 A1 * | 7/2011 | Shaffer | .................... | 375/240.01 |

\* cited by examiner

*Primary Examiner* — James R Sheleheda
(74) *Attorney, Agent, or Firm* — Guntin & Gust, PLC; Jay H. Anderson

(57) ABSTRACT

Methods and systems for closed caption processing are described. In an embodiment, a source signal may be accessed. The source signal may include a video signal and closed caption information embedded within the video signal. The closed caption information may be extracted from the source signal. A content request may be received over a network from an access device. A caption setting associated with the access device may be accessed. The video signal may be provided in a video stream over the network to the access device. The closed caption information may be provided over the network in a caption stream in accordance with accessing of the caption setting. Additional systems and methods are disclosed.

25 Claims, 18 Drawing Sheets

METHOD AND SYSTEM FOR CLOSED CAPTION PROCESSING

FIELD

This application relates to a method and system for content processing, and more specifically to methods and systems for closed captioning processing.

BACKGROUND

During the viewing of a television program, a television viewer may seek closed caption information. The closed caption information may be presented on a display device to the television viewer without enabling the user to modify attributes regarding the presentation of the closed caption information.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for closed caption processing are described. In the following description, for purposes of explanation, numerous specific details are set forth in order to provide a thorough understanding of example embodiments. It will be evident, however, to one skilled in the art that embodiments of the present invention may be practiced without these specific details.

In an example embodiment, a source signal may be accessed. The source signal may include a video signal and closed caption information embedded within the video signal. The closed caption information may be extracted from the source signal. A content request may be received over a network from an access device. A caption setting associated with the access device may be accessed. The video signal may be provided over the network in a video stream to the access device. The closed caption information may be provided over the network in a caption stream in accordance with accessing of the caption setting.

In an example embodiment, a caption display preference may be accessed. A content request may be provided to a server. A video stream including a video signal may be received in accordance with the content request. A caption stream including caption information may be received in accordance with the content request. The video signal may be provided for presentation. The caption information may be provided for presentation in a graphic overlay of the video signal in accordance with the caption display preference.

In an example embodiment, a video signal may be accessed. Closed caption information embedded within the video signal may be extracted. A screen region designation associated with a receiver of the video signal may be accessed. The screen region designation may include designation of one or more sectors of a plurality of available sectors of a display device. The video signal may be provided for presentation on the display device. The closed caption information may be provided for presentation on the display device in a video overlay of the video signal in accordance with the screen region designation.

Figure 1:
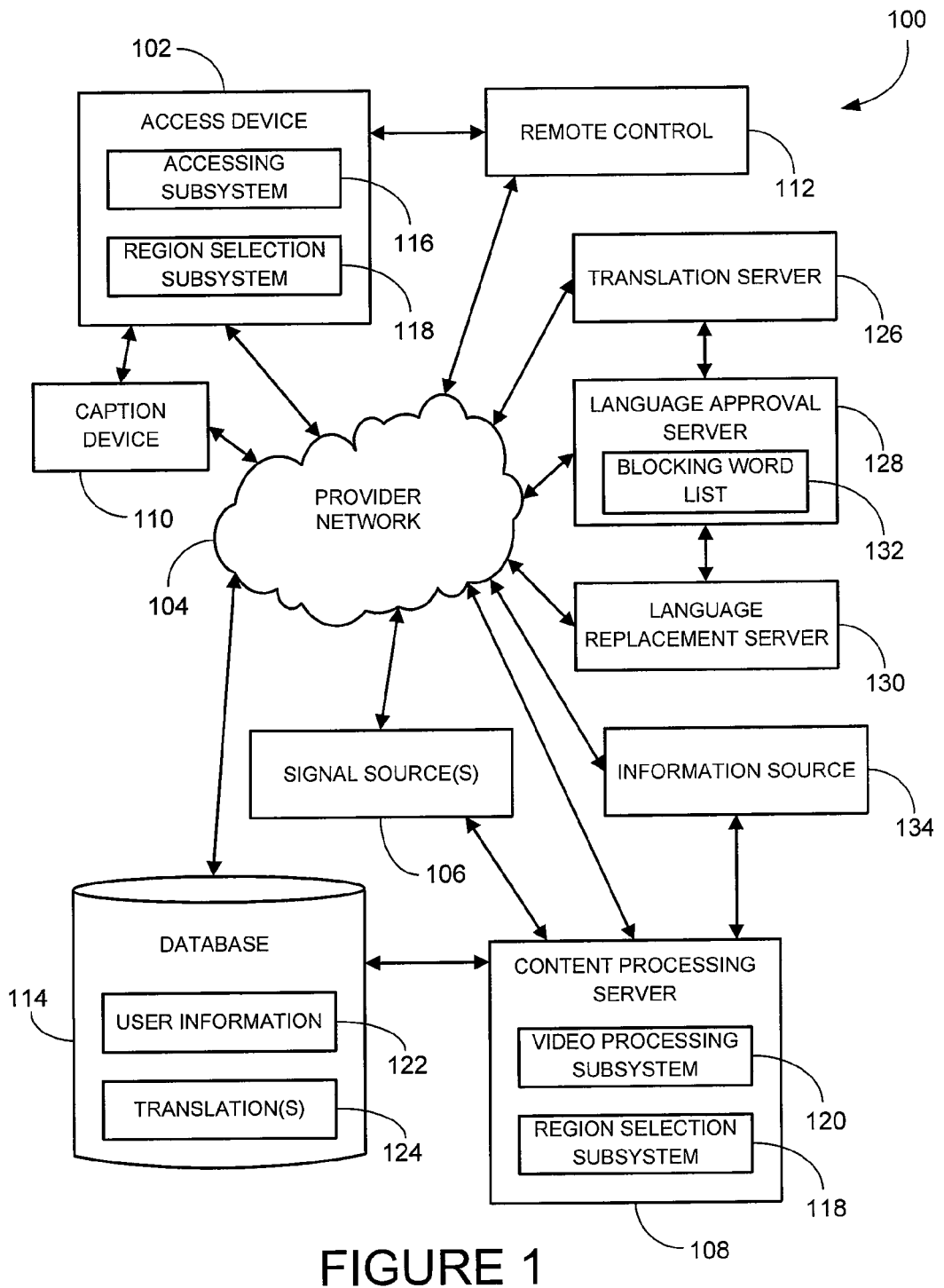
FIG. 1 is a block diagram of an example content system according to an example embodiment.

FIG. 1 illustrates an example content system 100. An access device 102 may request content over a provider network 104 from a content processing system 108. The content processing system 108 receives a source signal from a signal source 106. The source signal received from the signal source may include a video signal and embedded closed caption information. The content processing server 108 processes the source signal and provides a video stream including a video signal and a content stream include a content signal to the access device 102.

The video signal portion of the source signal may be a sequence of images and one or more associated audio tracks. The video signal may be a high quality video stream (e.g., MPEG-4) that is transcoded for distribution to the access device 102. The video signal may include standard definition (SD) or high definition (HD) video signals in NTSC (National Television System Committee), PAL (Phase Alternation Line), SECAM (Systeme Electronique Couleur Avec Memoire), sequence of bitmaps or other signal formats that transport a sequence of images. The form of the video signal may be modified to enable implementations of various formats and resolutions. The video signal may provide a variety of content types including, without limitation, television programs, music, movies, and commercials.

The access device 102 may use an accessing subsystem 116 to access the content provided by or through the content processing server 108. The access device 102 may also use a region selection subsystem 118 to designate regions of a display device for presentation of the closed caption information. Examples of the access device 102 include a set-top box (STB), a receiver card, a mobile telephone, a personal digital assistant (PDA), a display device, a portable gaming unit, and a computing system; however other devices may also be used.

The access device 102 may be controlled by a remote control 112. The remote control 112 may be able to receive biometric information from a user of the remote control 112 for verified access of the access device 102.

The provider network 104 may be a television distribution network, Global System for Mobile Communications (GSM)

network, an Internet Protocol (IP) network, a Wireless Application Protocol (WAP) network, and/or a WiFi network. Other networks may also be used.

The signal source 106 may be a television station (e.g., including a single broadcast channel or a number of broadcast channels), a broadcast network, a server, stored content, a digital versatile disc (DVD), or the like. The signal source 106 may be a local content source and/or a remote content source to the content processing server 108.

The closed caption information may be provided from the content processing server 108 over the provider network 104 to the access device 102 and/or a caption device 110. Examples of the caption device 110 include a mobile telephone, a PDA, or a portable gaming unit; however other devices may also be used.

The content processing server 108 may include the region selection subsystem 118 and/or a video processing subsystem 120. The video processing subsystem 120 may process the received source and generate the video stream and the caption stream that is provided by the content processing server 108.

The content processing server 108 may obtain user information 122 regarding a user during the utilization of the region selection subsystem 118 and/or the video processing subsystem 120 from a database 114. In addition, one or more translations 124 of closed caption information may be stored in the database 114.

A translation of closed caption information may also be received by providing closed caption information to a translation server 126 and receiving a translation. The content processing server 108 may communicate with a language approval server 128 to use a blocking word list 132 for one or more users to enable one or more designated words from being provided to the access device 102 and/or the caption device 110. The content processing server 108 may also communication with a language replacement server 130 to replace words of the closed caption information to replace one or more certain words before being provided to the access device 102 and/or the caption device 110.

An information source 134 may provide additional information to the access device 102 for presentation on a display device. The additional information may be communicated through remote desktop protocol (RDP) or otherwise communicated. Examples of the information source 134 include information websites (e.g., YAHOO.COM) and commerce websites (e.g., EBAY.COM). However, other information sources 134 may also be used.

Figure 2:
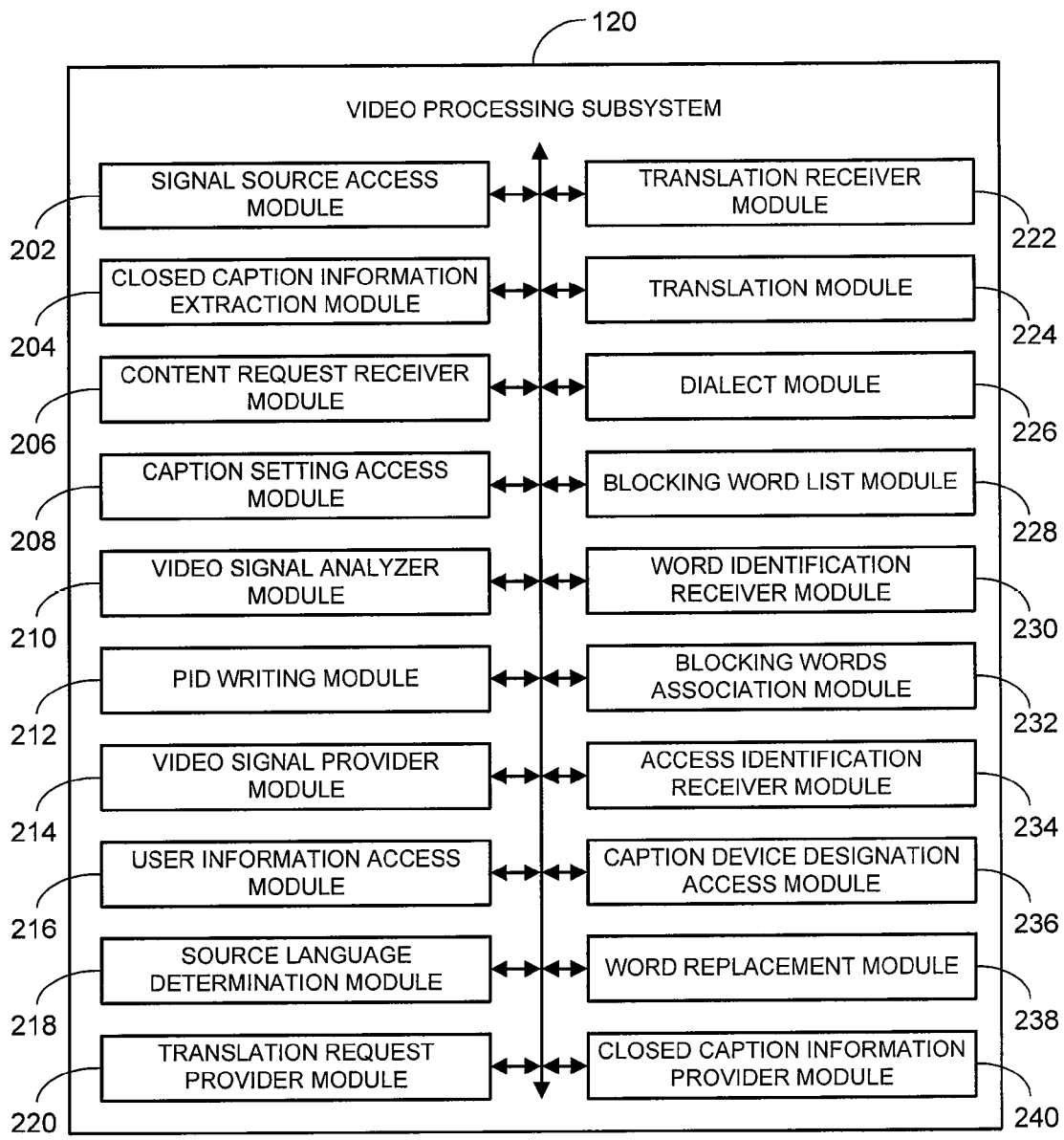
FIG. 2 is a block diagram of a video processing subsystem that may be deployed in the content system of FIG. 1 according to an example embodiment.

FIG. 2 illustrates a video processing subsystem 120 that may be deployed in the content processing server 108 of the content system 100 (see FIG. 1) or otherwise deployed in another system.

The video processing subsystem 120 may include a signal source access module 202, a closed caption information extraction module 204, a content request receiver module 206, a caption setting access module 208, a video signal analyzer module 210, a PID writing module 212, a video signal provider module 214, user information access module 216, a source language determination module 218, a translation request provider module 220, a translation receiver module 222, a translation module 224, a dialect module 226, a blocking word list module 228, a word identification receiver module 230, a blocking words association module 232, an access identification receiver module 234, a caption device designation access module 236, a word replacement module 238, and/or a closed caption information provider module 240. Other modules may also be included.

The signal source access module 202 accesses a source signal from the signal source 106 (see FIG. 1). The source signal may include a video signal and closed caption information embedded within the video signal. The closed caption information extraction module 204 extracts the closed caption information from the source signal.

The content request receiver module 206 receives a content request from the access device 102 (see FIG. 1). The caption setting access module 208 accesses a caption setting associated with the access device 102.

The video signal analyzer module 210 analyzes the video signal to determine positional information associated with video content. The PID writing module 212 writes a positional information packet ID (PID) for the video stream in accordance with the analyzing of the video signal by the video signal analyzer module 210.

The video signal provider module 214 provides the video signal over the network 104 in a video stream to the access device 102. The video signal may be provided in accordance with a positional information PID written by the PID writing module 212. The user information access module 216 accesses the user information 122 associated with a user of the access device 102. The source language determination module 218 determines a source language of the video signal.

The translation request provider module 220 provides a translation request over the provider network 104 to the translation server 126. The translation request may include a request to translate the closed caption information into a target language. The translation request may be provided to the translation server 126 in accordance with the received content request and/or the accessed caption setting. The translation receiver module 222 receives the translation 124 of the closed caption information over the provider network 104 in the target language from the database 114 and/or the translation server 126.

The translation module 224 translates the closed caption information into a target language. The translation may be performed in accordance with a received content request, an accessed caption setting, the accessed user information 122 and/or a source language determination of the closed caption information.

The dialect module 226 accesses dialect information associated with a user of the access device 102. The dialect information may be accessed in accordance with the accessed caption setting and/or the modification of one or more words of the closed caption information.

The blocking word list module 228 provides user identification to the language approval server 128 in accordance with the accessed caption setting and the receipt of the blocking word list 132 from the language approval server 128. The word identification receiver module 230 receives word identification of one or more blocking words. The blocking words association module 232 associates the one or more blocking words with the access device 102. The access identification receiver module 234 receives access identification of a user associated with the access device 102.

The caption device designation access module 236 accesses a caption device designation of a user of the access device 102 in accordance with the caption setting. The caption device designation may include a designation of the caption device 110 associated with the user.

The word replacement module 238 identifies one or more words of the closed caption information for replacement. The identification of the one or more words may be in accordance with the receipt of the content request, the accessed caption setting, the one or more words provided over the provider network 104 to the language replacement server 130, and/or the receipt of one or more replacement words.

The closed caption information provider module 240 provides the closed caption information over the network 104 in a caption stream. The closed caption information may be provided in accordance with the accessed caption setting and/or the translation of the closed caption information, the receipt of the translation 124, the modification of one or more words, the receipt of the blocking word list 132, the association of one or more blocking words, the receipt of the access identification of the user, and/or the receipt of one or more replacement words. The closed caption information may be provided to the caption device 110 and/or the access device 102.

Figure 3:
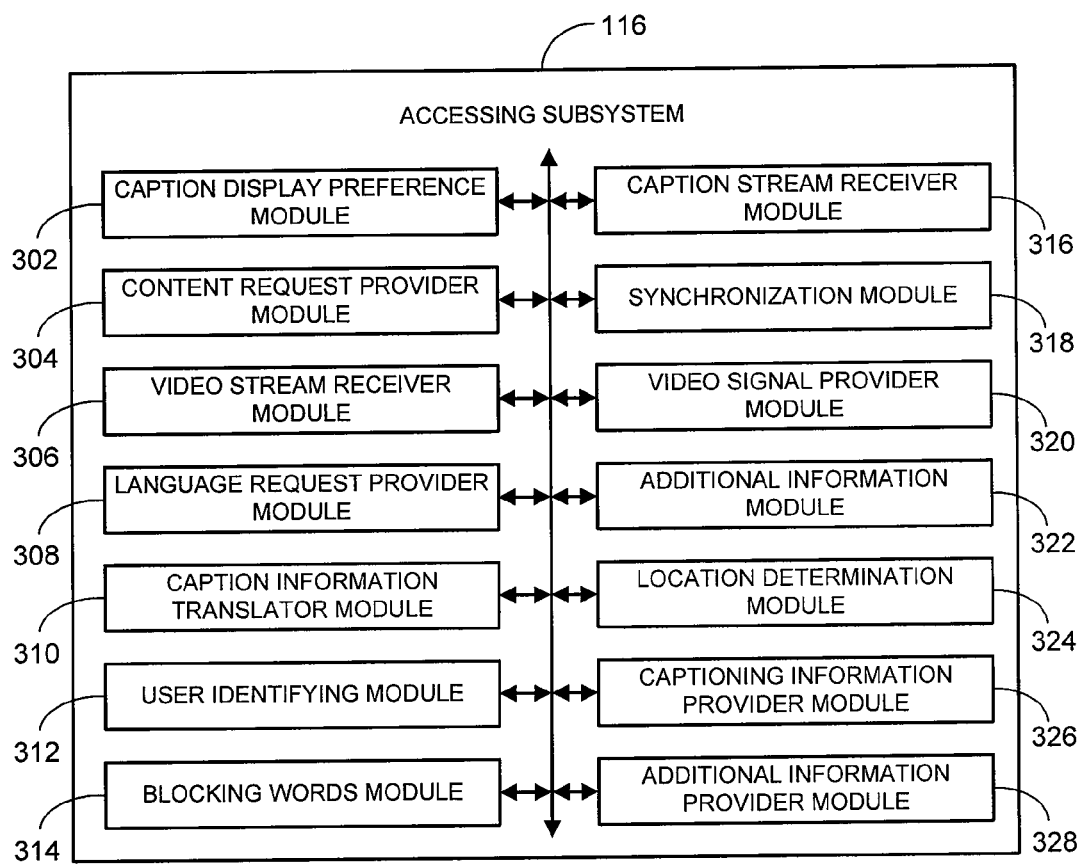
FIG. 3 is a block diagram of an accessing subsystem that may be deployed in the content system of FIG. 1 according to an example embodiment.

FIG. 3 illustrates an accessing subsystem 116 that may be deployed in the access device 102 of the content system 100 (see FIG. 1) or otherwise deployed in another system.

The accessing subsystem 300 may include a caption display preference module 302, a content request provider module 304, a video stream receiver module 306, a language request provider module 308, a caption information translator module 310, a user identifying module 312, a blocking words module 314, a caption stream receiver module 316, a synchronization module 318, a video signal provider module 320, an additional information module 322, a location determination module 324, a caption information provider module 326, and/or an additional information provider module 328. Other modules may also be used.

The caption display preference module 302 receives the caption display preference, stores the caption display preference, and/or accesses a caption display preference. The content request provider module 304 provides a content request to the content processing server 108.

The video stream receiver module 306 receives a video stream including a video signal in accordance with the content request. The language request provider module 308 provides a language request to the content processing server 108 in accordance with the caption display preference. The caption information translator module 310 translates the caption information to a target language in accordance with the caption display preference.

The user identifying module 312 receives a user identification associated with the word identification, identifies a user associated with the providing of the content request, and/or notifies the content processing server 108 regarding the identification of the user.

The blocking words module 314 receives identification of one or more blocking words and/or provides word identification of one or more blocking words to the language approval server 128 and/or the content processing server 108.

The caption stream receiver module 316 receives a caption stream including caption information in accordance with the content request, the providing of the language request, the translation of the caption information, the providing of the word identification, and/or the notifying of the content processing server 108.

The synchronization module 318 synchronizes the video stream and the caption stream. The video signal provider module 320 provides the video signal for presentation. The packet ID access module accesses a positional information PID in the video stream associated with video content.

The additional information module 322 receives a request for additional information and/or accesses the additional information from the information source 134.

The location determination module 324 determines a location for the caption information and/or the additional information in accordance with video content of the video signal.

The caption information provider module 326 provides the caption information for presentation in a graphic overlay of the video signal accordance with the caption display preference, the synchronization, and/or the accessing of the positional information PID, and/or the determination of the location.

The additional information provider module 328 provides the additional information for presentation in an additional graphic overlay of the video signal. The additional information may be provided for presentation in accordance with the determination of the location and/or the caption display preference.

Figure 4:
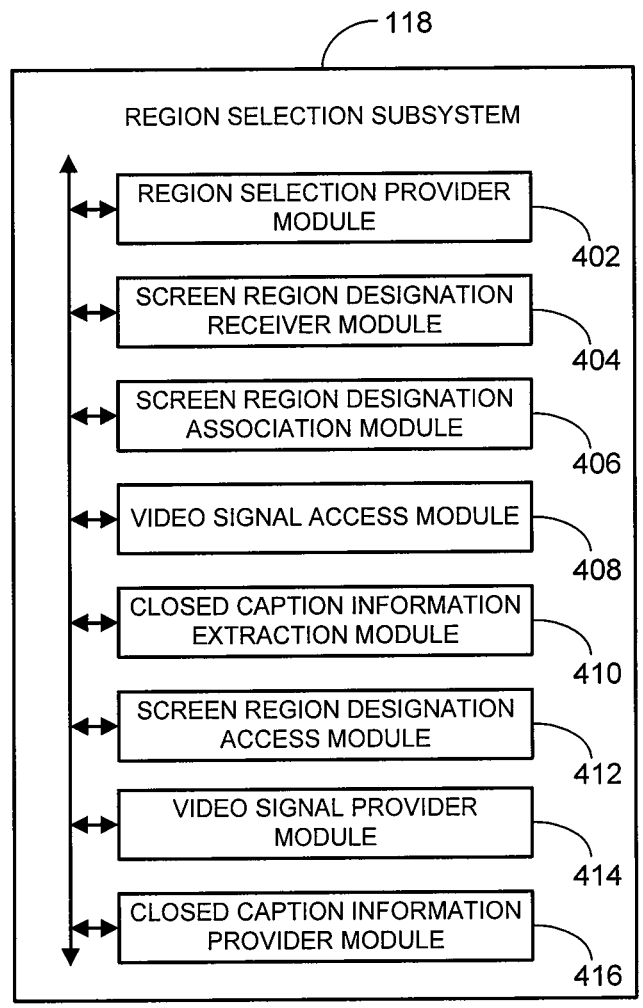
FIG. 4 is a block diagram of a region selection subsystem that may be deployed in the content system of FIG. 1 according to an example embodiment.

FIG. 4 illustrates a region selection subsystem 118 that may be deployed in the access device 102 and/or the content processing server 108 of the content system 100 (see FIG. 1) or otherwise deployed in another system.

The region selection subsystem 118 may include a region selection provider module 402, a screen region designation receiver module 404, a screen region designation association module 406, a video signal access module 408, a closed caption information extraction module 410, a screen region designation access module 412, a video signal provider module 414, and/or a closed caption information provider module 416. Other modules may also be used.

The region selection provider module 402 provides a region selection display for presentation. The screen region designation receiver module 404 receives the screen region designation associated with the region selection display.

The screen region designation association module 406 associates the screen region designation with a receiver. The video signal access module 408 accesses a video signal.

The closed caption information extraction module 410 extracts closed caption information embedded within the video signal. The screen region designation access module 412 accesses a screen region designation associated with a receiver of the video signal, the screen region designation including designation of one or more sectors of a number of available sectors of a display device.

The video signal provider module 414 provides the video signal for presentation. The closed caption information provider module 416 provides closed caption information for presentation in a video overlay of the video signal in accordance with the screen region designation.

Figure 5:
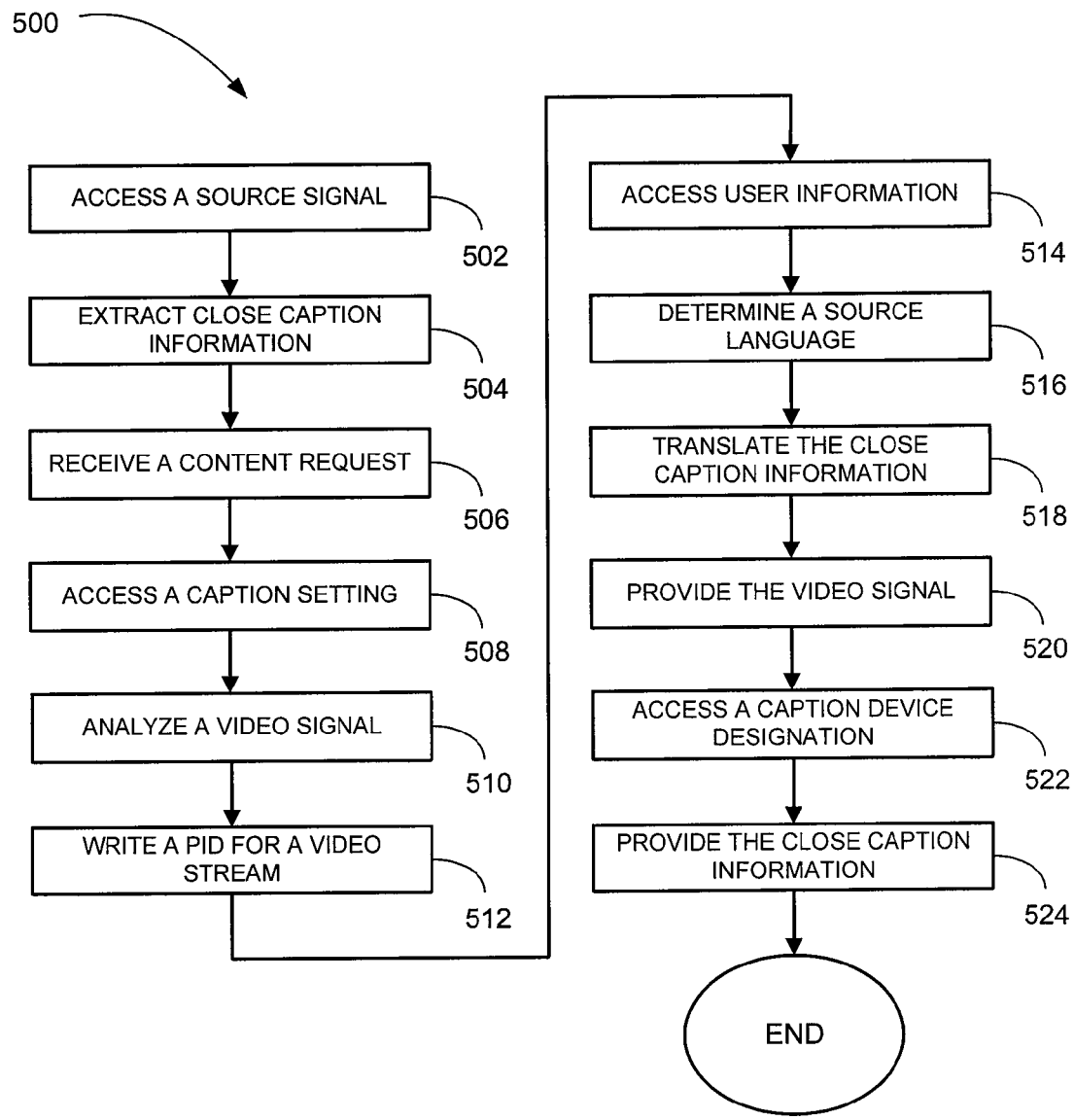
FIGS. 5-10 are flowcharts illustrating a method for closed caption information processing in accordance with an example embodiment.

FIG. 5 illustrates a method 500 for closed caption information processing according to an example embodiment. The method 500 may be performed by content processing server 108 of the content system 100 (see FIG. 1) or otherwise performed.

A source signal is accessed from the signal source 106 (see FIG. 1) at block 502. The source signal may include a video signal and closed caption information embedded within the video signal. The closed caption information is extracted from the source signal at block 504.

A content request is received from the access device 102 at block 506. A caption setting associated with the access device 102 is accessed at block 508. The caption setting may include a user specified captioning language and/or a dialect information. The caption setting may include a caption device designation that defines a device (e.g., the access device 102 and/or the caption device 110) to which closed caption information is to be provided. Other caption display settings may also be used.

The video signal may be analyzed to determine positional information associated with video content at block 510. A positional information PID may be written for the video stream in accordance with the analyzing of the video signal at block 512. For example, the positional information PID may indicate a position in which the closed caption information and/or additional information should be overlaid in the video signal.

The user information 122 associated with a user of the access device 102 may be accessed at block 514. A source language of the video signal may be determined at block 516.

The closed caption information may be translated into a target language in accordance with the receiving of the content request and the accessing of the caption setting at block 518. The translating of the closed caption information may be in accordance with the accessing of the user information and the determining of the source language.

The video signal is provided in a video stream over the provider network 104 to the access device 102 at block 520. The provided video signal may include the positional information PID when written during the operations at block 512.

A caption device designation of a user of the access device may be accessed at block 522. The caption device designation may include a designation of the caption device 110 associated with the user.

The closed caption information is provided in a caption stream in accordance with accessed caption setting and/or the translating of the closed caption information at block 524. The closed caption information may be provided to the access device 102 and/or the caption device 110 in accordance with the caption device designation.

Figure 6:
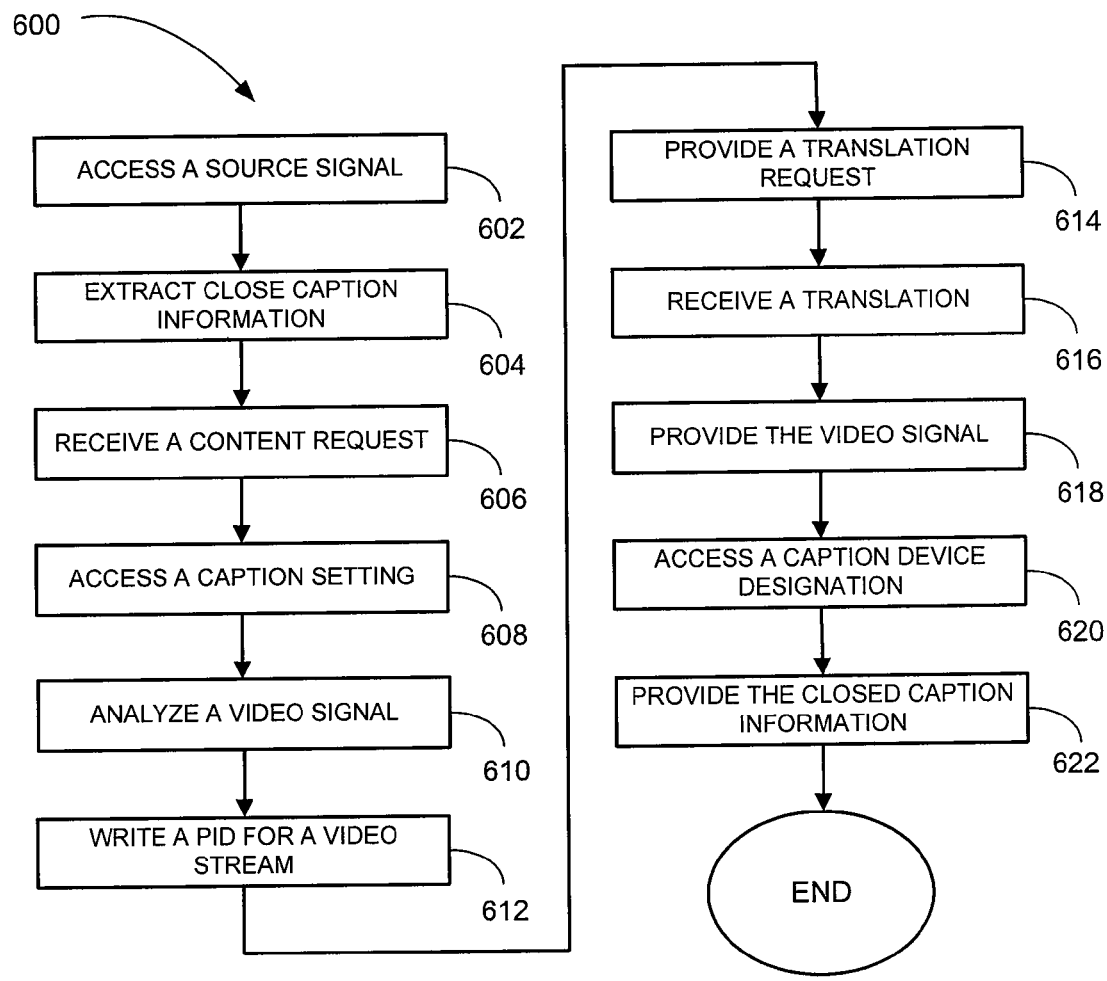

FIG. 6 illustrates a method 600 for closed caption information processing according to an example embodiment. The method 600 may be performed by the content processing server 108 of the content system 100 (see FIG. 1) or otherwise performed.

A source signal is accessed from the signal source 106 (see FIG. 1) at block 602. The closed caption information is extracted from the source signal at block 604. A content request is received from the access device 102 at block 606. A caption setting associated with the access device 102 is accessed at block 608.

The video signal may be analyzed to determine positional information associated with video content at block 610. A positional information PID may be written for the video stream in accordance with the analyzing of the video signal at block 612.

At block 614, a translation request may be provided over the provider network 104 to the translation server 126 in accordance with the receipt of a content request and the accessed caption setting. The translation request may include a request to translate the closed caption information into a target language. At block 616, a translation of the closed caption information may be received over the provider network 104 from the translation server 126 in the target language.

The video signal is provided in a video stream to the access device 102 at block 618. The provided video signal may include a positional information PID.

A caption device designation of a user of the access device in accordance with the caption setting may be accessed at block 620. The caption device designation may include a designation of the caption device 110 associated with the user.

The closed caption information is provided in a caption stream in accordance with the accessed caption setting and/or the receiving of the translation at block 622. The closed caption information may be provided to the access device 102 and/or the caption device 110 in accordance with the caption device designation.

Figure 7:
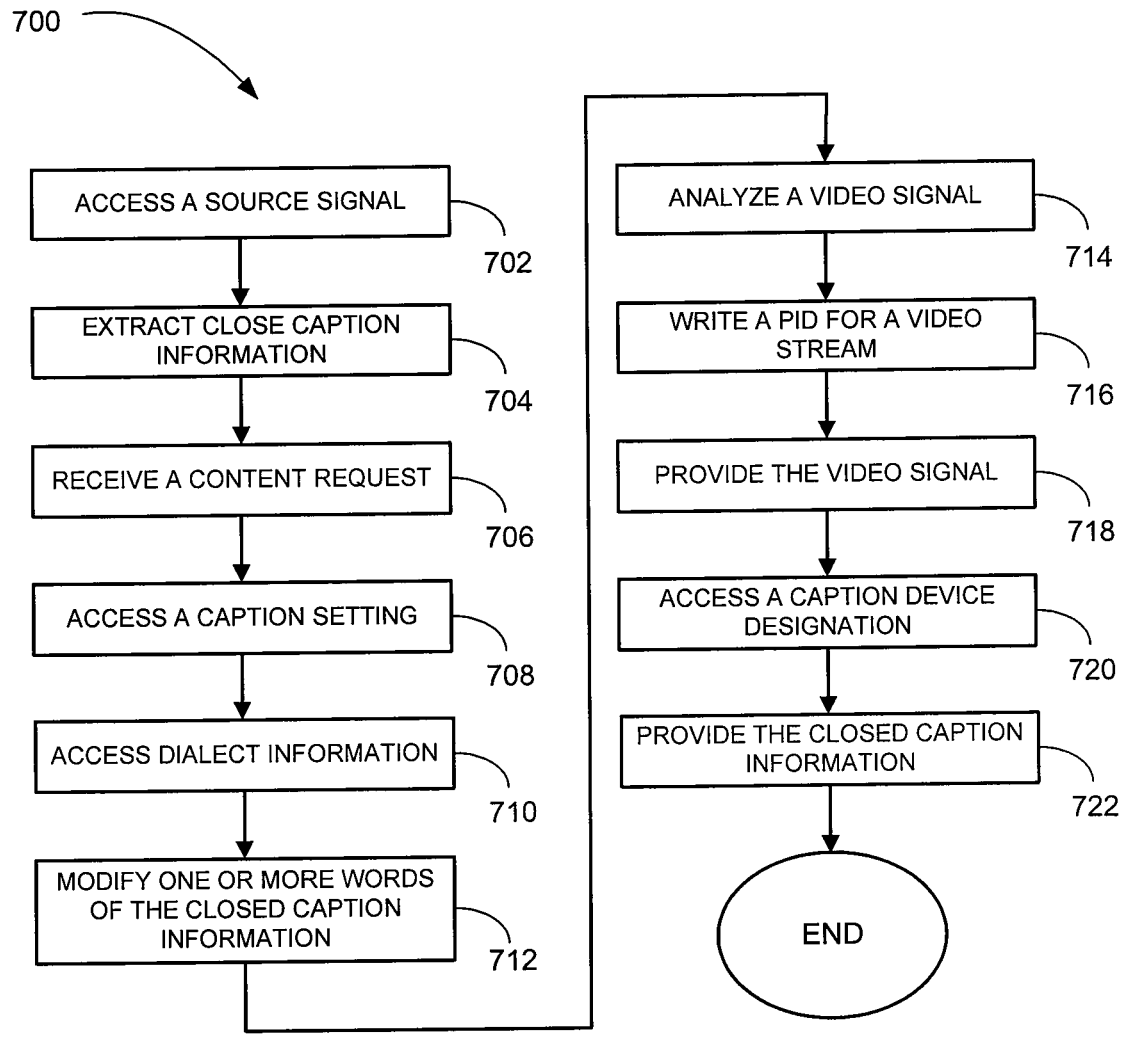

FIG. 7 illustrates a method 700 for closed caption information processing according to an example embodiment. The method 700 may be performed by the content processing server 108 of the content system 100 (see FIG. 1) or otherwise performed.

A source signal is accessed from the signal source 106 at block 702. The closed caption information is extracted from the source signal at block 704.

A content request is received from the access device 102 at block 706. A caption setting associated with the access device 102 is accessed at block 708.

Dialect information associated with a user of the access device 102 may be accessed in accordance with the accessed caption setting at block 710.

One or more words of the closed caption information may be modified in accordance with the accessing of the dialect information at block 712. For example, the accessed dialect information may be used to change the closed caption information from "y'all" to "you all" based on the dialect of the user.

The video signal may be analyzed to determine positional information associated with video content at block 714. At block 716, a positional information PID may be written for the video stream in accordance with the analyzing of the video signal performed during the operations at block 714.

The video signal is provided in a video stream to the access device 102 at block 718. The provided video signal may include a positional information PID. At block 720, a caption device designation of a user of the access device 102 may be accessed.

The closed caption information is provided in a caption stream in accordance with accessed caption setting and/or the modifying of the one or more words at block 722. The closed caption information may be provided to the access device 102 and/or the caption device 110 in accordance with the caption device designation.

Figure 8:
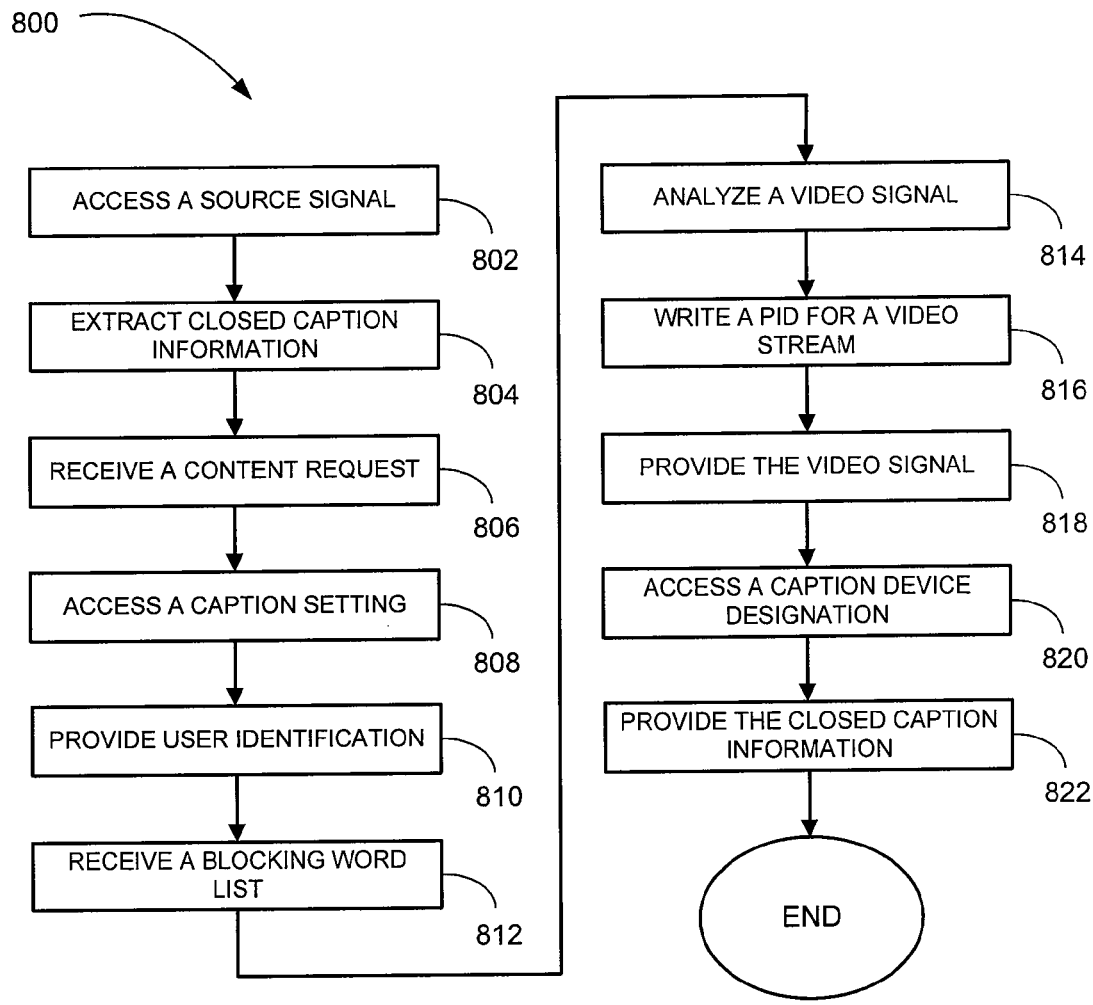

FIG. 8 illustrates a method 800 for closed caption information processing according to an example embodiment. The method 800 may be performed by the content processing server 108 of the content system 100 (see FIG. 1) or otherwise performed.

A source signal is accessed from the signal source 106 at block 802. The closed caption information is extracted from the source signal at block 804.

A content request is received from an access device at block 806. A caption setting associated with the access device 102 is accessed at block 808.

At block 810, user identification may be provided to the language approval server 128 in accordance with the accessing of the caption setting performed during the operations at block 808. The blocking word list 132 may be received from the language approval server 128 at block 812.

The video signal may be analyzed to determine positional information associated with video content at block 814. At block 816, a position location PID may be written for the video stream in accordance with the analyzing of the video signal performed during the operations at block 814.

The video signal is provided in a video stream to the access device 102 at block 818. The provided video signal may include a positional information PID. A caption device designation of a user of the access device 102 in accordance with the caption setting may be accessed at block 820.

At block 822, the closed caption information is provided in a caption stream in accordance with accessing of the caption setting and/or receiving of the blocking word list. The closed caption information may be provided to the access device and/or the caption device in accordance with the caption device designation.

Figure 9:
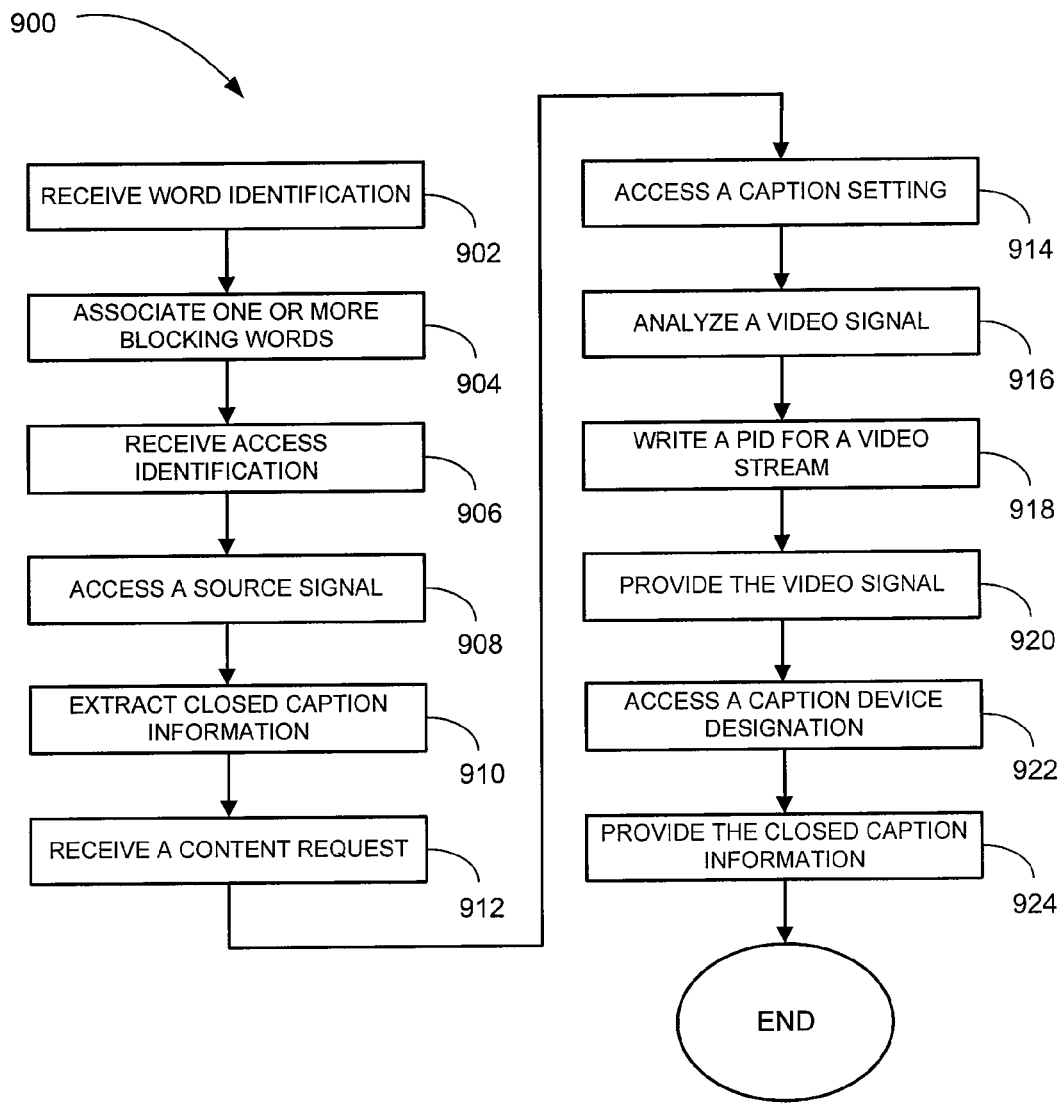

FIG. 9 illustrates a method 900 for closed caption information processing according to an example embodiment. The method 900 may be performed by the content processing server 108 of the content system 100 (see FIG. 1) or otherwise performed.

Word identification of one or more blocking words may be received at block 902. The one or more blocking words may be associated with the access device 102 at block 904.

Access identification of a user associated with the access device 102 may be received at block 902. A source signal is accessed from the signal source 106 at block 908. The closed caption information is extracted from the source signal at block 910.

A content request is received from the access device 102 at block 912. A caption setting associated with the access device 102 is accessed at block 914.

The video signal may be analyzed to determine positional information associated with video content at block 916. At block 918, a position information PID may be written for the video stream in accordance with the analyzing of the video signal performed during the operations at block 916.

The video signal is provided in a video stream to the access device 102 at block 920. The provided video signal may include a positional information PID. A caption device designation of a user of the access device 102 may be accessed at block 922.

The closed caption information is provided in a caption stream in accordance with accessing of the caption setting, the receiving of the access identification of the user, and/or the associating of the one or more blocking words at block 924. The closed caption information may be provided to the access device 102 and/or the caption device 110 in accordance with the caption device designation.

In an example embodiment, the operations performed at block 902 and block 904 may be used to prevent one or more blocking words contained within closed captioning information from being sent to the access device 102 and/or the caption device 110.

Figure 10:
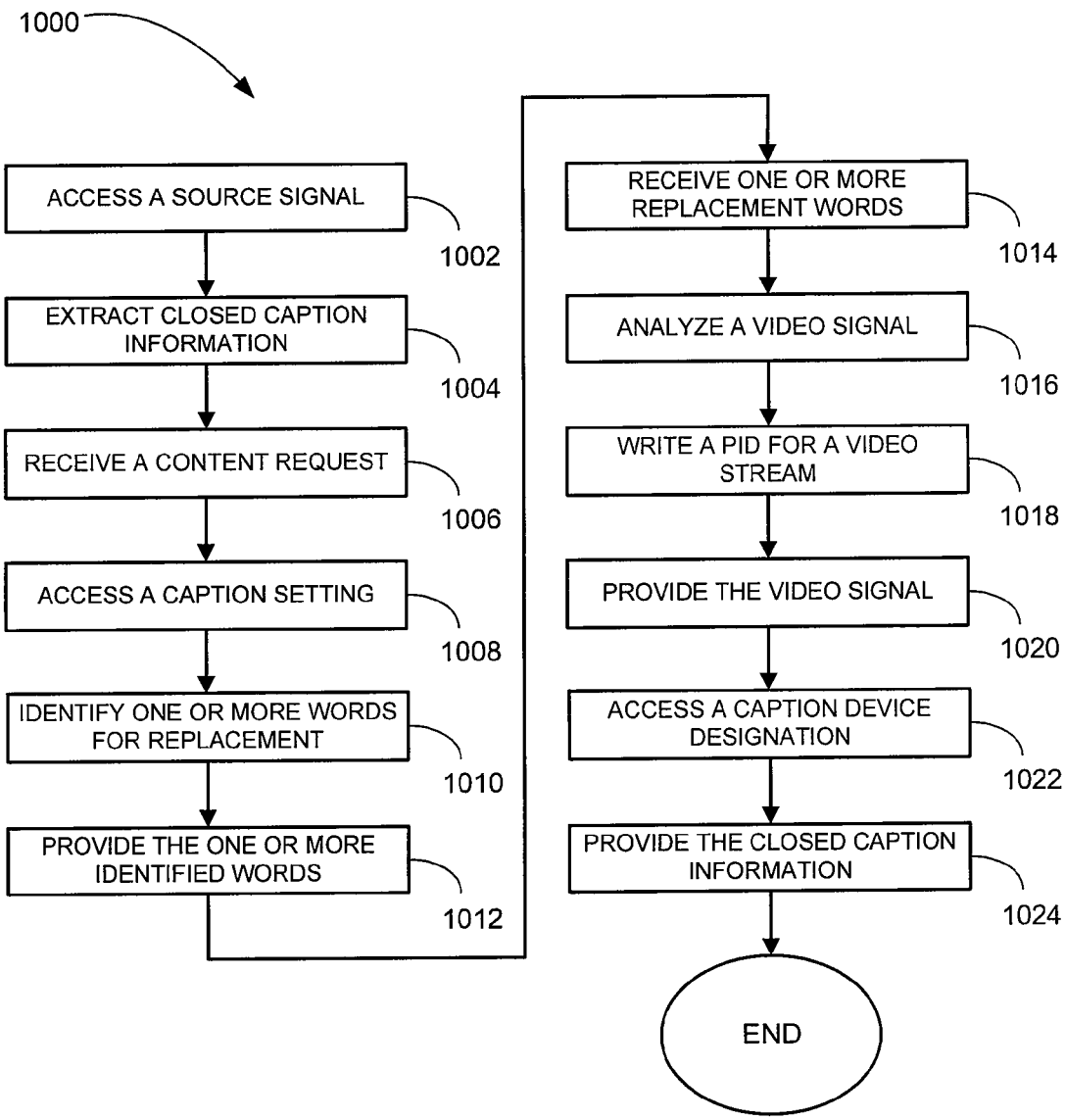

FIG. 10 illustrates a method 1000 for closed caption information processing according to an example embodiment. The method 1000 may be performed by the content processing server 108 of the content system 100 (see FIG. 1) or otherwise performed.

A source signal is accessed from the signal source 106 at block 1002. The closed caption information is extracted from the source signal at block 1004.

A content request is received from the access device 102 at block 1006. A caption setting associated with the access device 102 is accessed at block 1008.

At block 1010, one or more words of the closed caption information may be identified for replacement in accordance with the receiving of the content request and the accessed caption setting.

The one or more identified words may be provided over the provider network 104 to the language replacement server 130 at block 1012. One or more replacement words may be received from the language replacement server 130 at block 1014.

The video signal may be analyzed to determine positional information associated with video content at block 1016. At block 1018, a position information PID may be written for the video stream in accordance with the analyzing of the video signal performed during the operations at block 1016.

The video signal is provided in a video stream to the access device 102 at block 1020. The provided video signal may include a positional information PID.

A caption device designation of a user of the access device 102 in may be accessed at block 1022. The closed caption information is provided in a caption stream in accordance with accessed caption setting and/or the receiving of the one or more replacement words at block 1024. The closed caption information may be provided to the access device 102 and/or the caption device 110 in accordance with the caption device designation.

Figure 11:
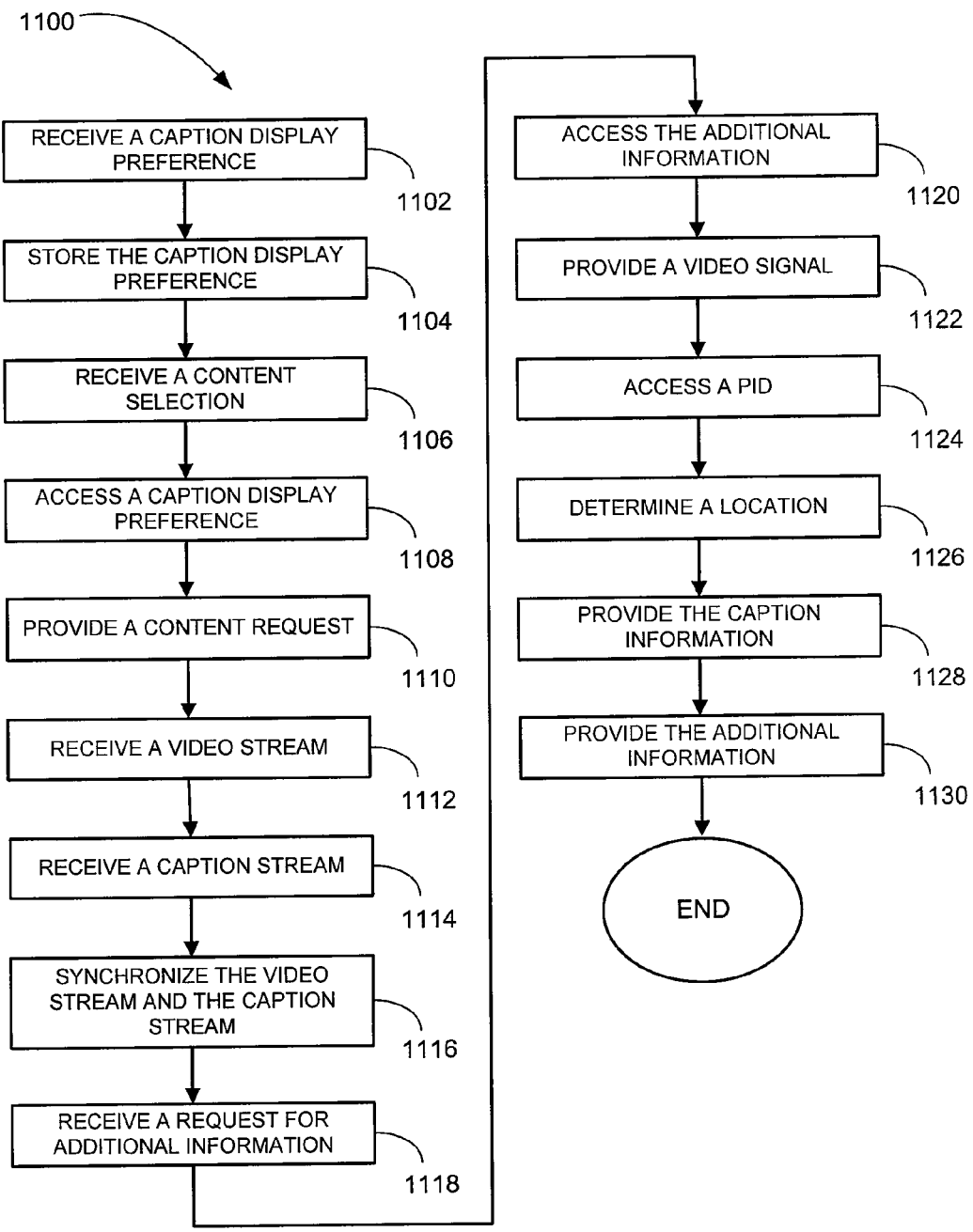
FIGS. 11-13 are flowcharts illustrating a method for stream processing in accordance with an example embodiment.

FIG. 11 illustrates a method 1100 for stream processing according to an example embodiment. The method 1100 may be performed by the access device 102 of the content system 100 (see FIG. 1) or otherwise performed.

A caption display preference of a user and/or the access device 102 may be received at block 1102. The caption display preference may include a caption color, a caption screen location, a caption transparency, a caption size, a caption language, or combinations thereof. The received caption display preference may be stored at block 1104.

A content selection may be received at block 1106. The caption display preference is accessed at block 1108. The accessing of the caption display preference may be stored caption display preference.

A content request is provided to the content processing server 108 at block 1110. A video stream including a video signal is received from the content processing server 108 in accordance with the content request at block 1112. A caption stream including caption information is received from the content processing server 108 in accordance with the content request at block 1114.

The video stream and the caption stream may be synchronized at block 1116. The synchronization may make the closed caption information be presented on the screen at an appropriate time given the video content of the video stream.

A request for additional information may be received at block 1118. The additional information may be accessed from the information source 134 at block 1120.

The video signal is provided for presentation at block 1122. The video signal may be provided to a display device for presentation and/or directly presented on the access device 102. A positional PID in the video stream associated with video content may be accessed at block 1124.

At block 1126, a location for the caption information and the additional information may be determined in accordance with the position location PID, the video content of the video signal and/or the caption display preference.

At block 1128, the caption information is provided for presentation in a graphic overlay of the video signal accordance with the caption display preference, the determining of the location, and/or the accessing of the position location PID. The caption information may be provided to a display device for presentation and/or directly presented on the access device 102. The caption stream may be synchronized for presentation with the video stream.

The additional information may be provided for presentation in an additional graphic overlay of the video signal at block 1130. The providing of the additional information may be provided for presentation in accordance with the determining of the location and the caption display preference.

Figure 12:
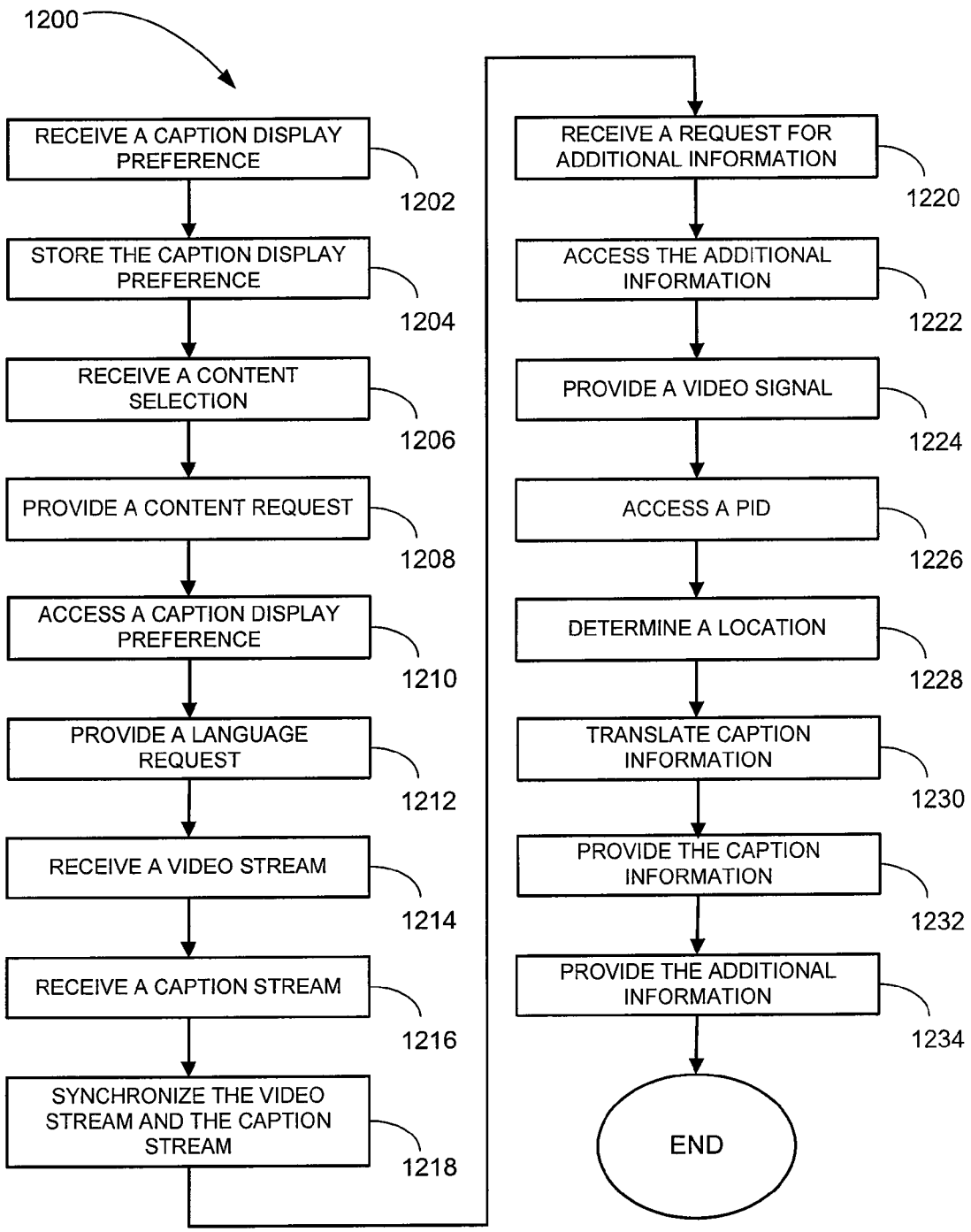

FIG. 12 illustrates a method 1200 for stream processing according to an example embodiment. The method 1200 may be performed by the access device 102 of the content system 100 (see FIG. 1) or otherwise performed.

A caption display preference may be received at block 1202. The received caption display preference may be stored at block 1204. A content selection may be received at block

1206. A content request is provided to the content processing server 108 at block 1208. A caption display preference is accessed at block 1210.

A language request may be provided to the content processing server 108 in accordance with the caption display preference at block 1212. A video stream including a video signal is received in accordance with the content request at block 1214.

A caption stream including caption information is received in accordance with the content request and/or the providing of the language request at block 1216. The video stream and the caption stream may be synchronized at block 1218.

A request for additional information may be received at block 1220. The additional information may be accessed from an information source at block 1222.

The video signal is provided for presentation at block 1224. A position information PID in the video stream associated with video content may be accessed at block 1226.

At block 1228, a location for the caption information and the additional information may be determined in accordance with video content of the video signal and/or the caption display preference. The caption information may be translated to a target language in accordance with the caption display preference at block 1230.

At block 1232, the caption information is provided for presentation in a graphic overlay of the video signal accordance with the caption display preference, the accessing of the position information PID, the determining of the location, and/or the translating of the caption information. The video stream and the caption stream may be provided for presentation in accordance with the synchronizing. The video signal and the caption information may be provided to a display device for presentation and/or directly presented on the access device 102 and/or the caption device 110.

The additional information may be provided for presentation in an additional graphic overlay of the video signal at block 1234. The providing of the caption information for presentation and the additional information for presentation is in accordance with the determining of the location and/or the caption display preference.

Figure 13:
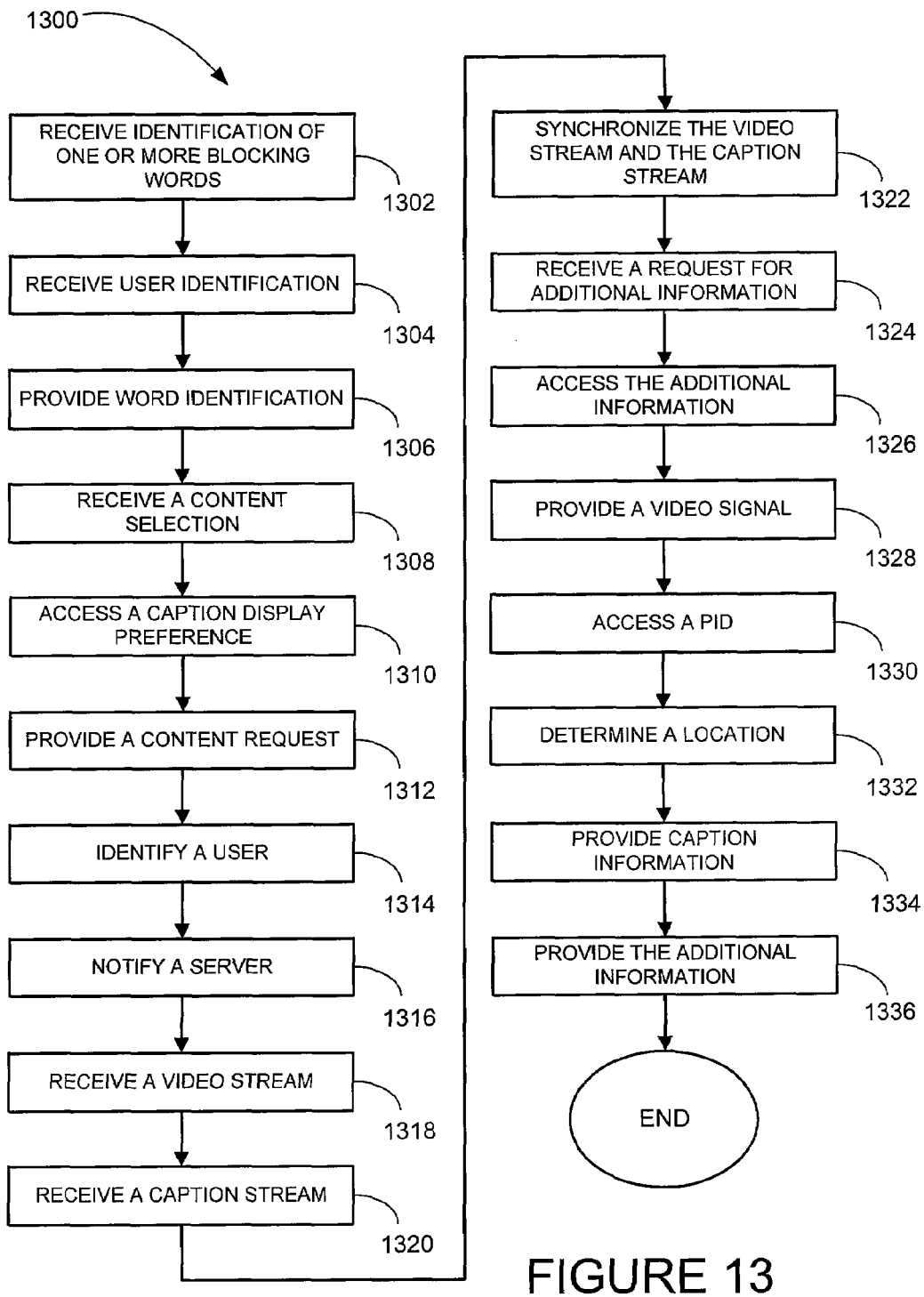

FIG. 13 illustrates a method 1300 for stream processing according to an example embodiment. The method 1300 may be performed by the access device 102 of the content system 100 (see FIG. 1) or otherwise performed.

Identification of one or more blocking words may be received at block 1302. User identification associated with the word identification may be received at block 1304.

Word identification of one or more blocking words may be provided to the language approval server 128 and/or the content processing server 108 at block 1306.

A content selection may be received at block 1308. A caption display preference is accessed at block 1310. A content request is provided to a server at block 1312.

A user associated with the receiving of the content selection and/or or the providing of the content request may be identified at block 1314. At block 1316, the content processing server 108 may be notified regarding the identifying of the user.

A video stream including a video signal is received in accordance with the content request at block 1318. A caption stream including caption information is received in accordance with the content request at block 1320. The receiving of the caption stream including the caption information may be in accordance with the content request, the providing of the word identification, and/or the notifying of the content processing server 108.

The video stream and the caption stream may be synchronized at block 1322. A request for additional information may be received at block 1324. The additional information may be accessed from the information source 134 at block 1326.

The video signal is provided for presentation at block 1328. A position information PID in the video stream associated with video content may be accessed at block 1330.

At block 1332, a location for the caption information and the additional information may be determined in accordance with video content of the video signal and/or the caption display preference.

At block 1334, the caption information is provided for presentation in a graphic overlay of the video signal accordance with the caption display preference, accessing of the PID and/or the determining of the location. The video stream and the caption stream may be provided for presentation in accordance with the synchronizing.

The additional information may be provided for presentation in an additional graphic overlay of the video signal at block 1336. The providing of the additional information for presentation may be in accordance with the determining of the location and/or the caption display preference.

Figure 14:
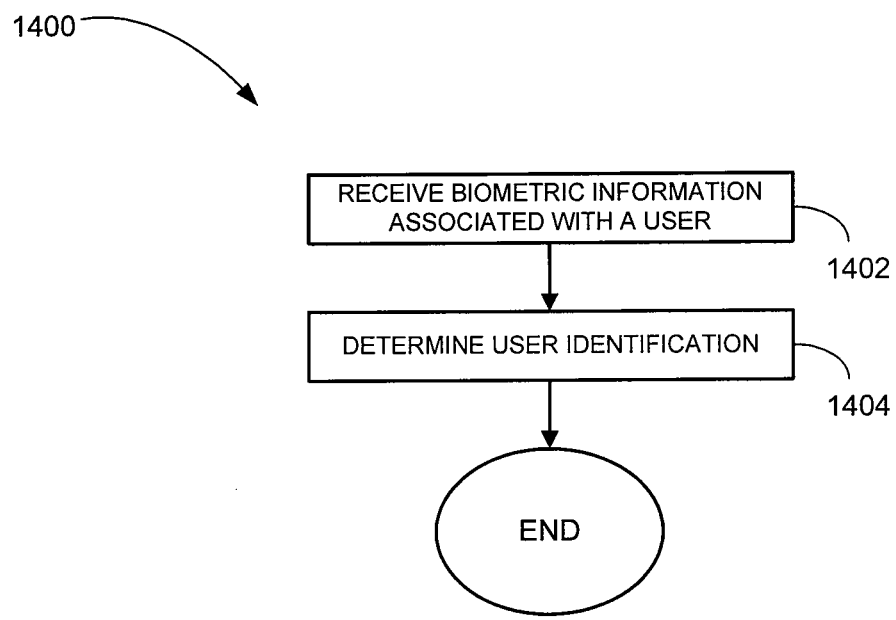
FIG. 14 is a flowchart illustrating a method for receiving user information in accordance with an example embodiment.

FIG. 14 illustrates a method 1400 for receiving user information according to an example embodiment. The method 1400 may be performed at block 1204, block 1212 (see FIG. 13) or otherwise performed.

Biometric information associated with the user is received at block 1402. The biometric information may be received from the remote control 112 or otherwise received. The user identification of the user may be determined in accordance with the biometric information at block 1404.

Figure 15:
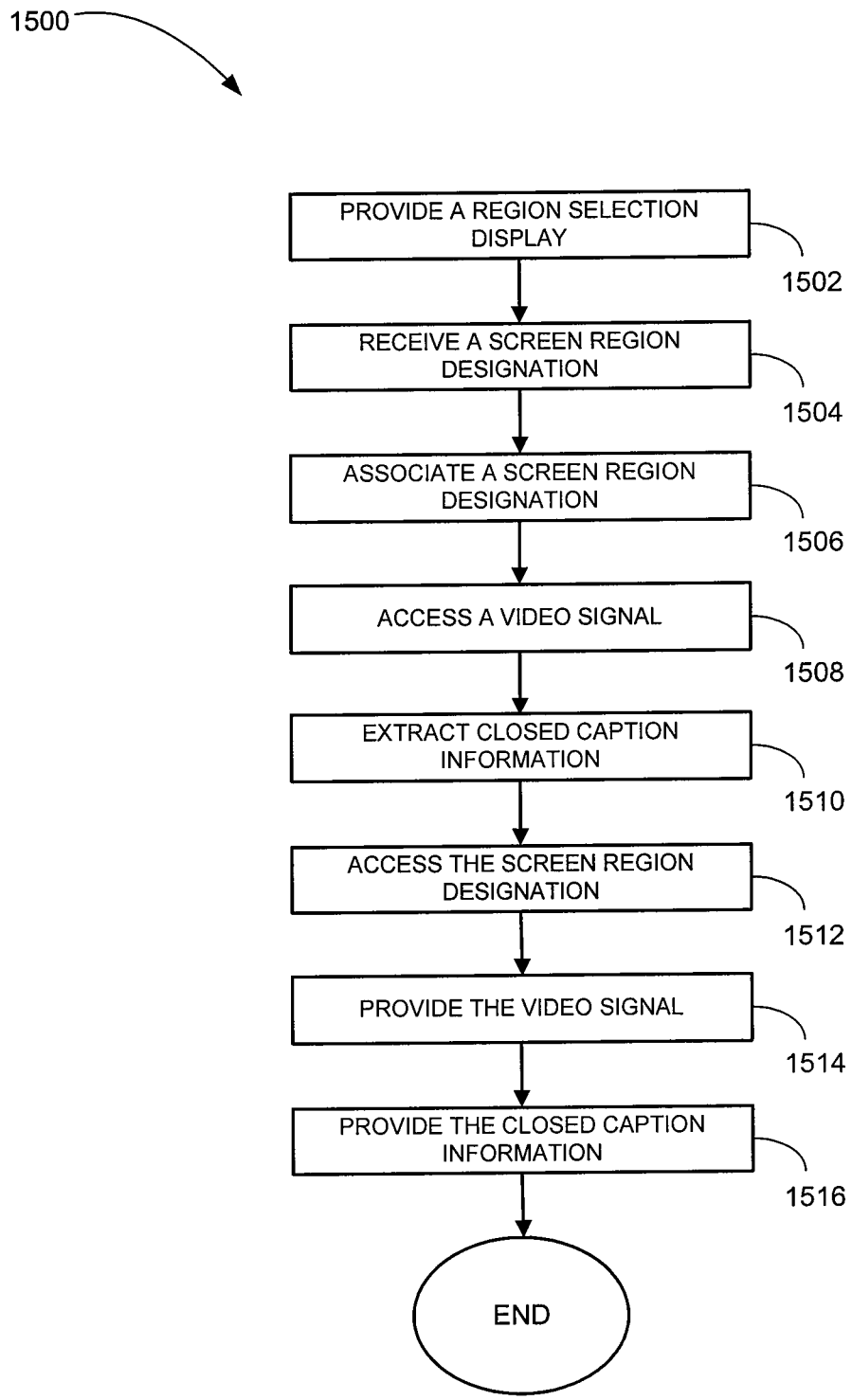
FIG. 15 is a flowchart illustrating a method for region selection in accordance with an example embodiment.

FIG. 15 illustrates a method 1500 for region selection according to an example embodiment. The method 1500 may be performed by the access device 102 and/or the content processing server 108 of the content system 100 (see FIG. 1) or otherwise performed.

A region selection display may be provided for presentation at block 1502. The screen region designation associated with the region selection display may be received at block 1504.

The screen region designation may be associated with the receiver at block 1506. A video signal is accessed at block 1508.

Closed caption information embedded within the video signal is extracted at block 1510. A screen region designation associated with a receiver of the video signal is accessed at block 1512. The screen region designation may include designation of one or more sectors of a number of available sectors of a display device.

The video signal is provided for presentation on the display device at block 1514. At block 1516, the closed caption information is provided for presentation on the display device in a video overlay of the video signal in accordance with the screen region designation.

Figure 16:
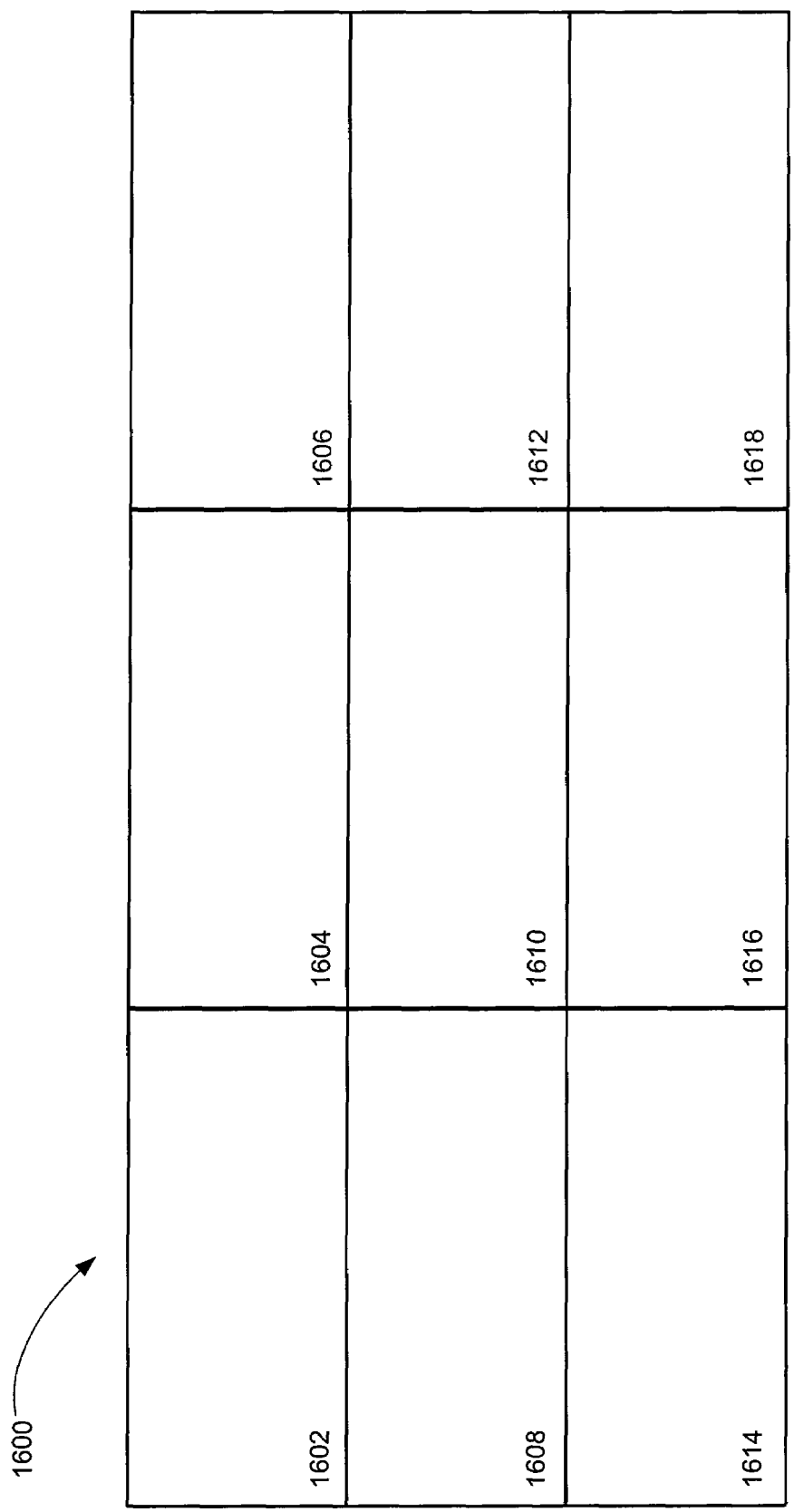
FIG. 16 is a block diagram of an example display in accordance with an example embodiment.

FIG. 16 illustrates an example region selection display 1600 according to an example embodiment. The region selection display 1600 may be presented during the operations at block 1502 (see FIG. 15) or otherwise provided.

The region selection display 1600 includes a number of regions 1602-1618 that may be designated for closed caption information. For example, a region 1604 and a region 1606 may be designated according to a screen region designation during the operations at block 1504 (see FIG. 15) to enable the closed caption information to be presented in the regions 1604, 1606. However, one or more different regions of the region selection display 1600 may be designated.

Figure 17:
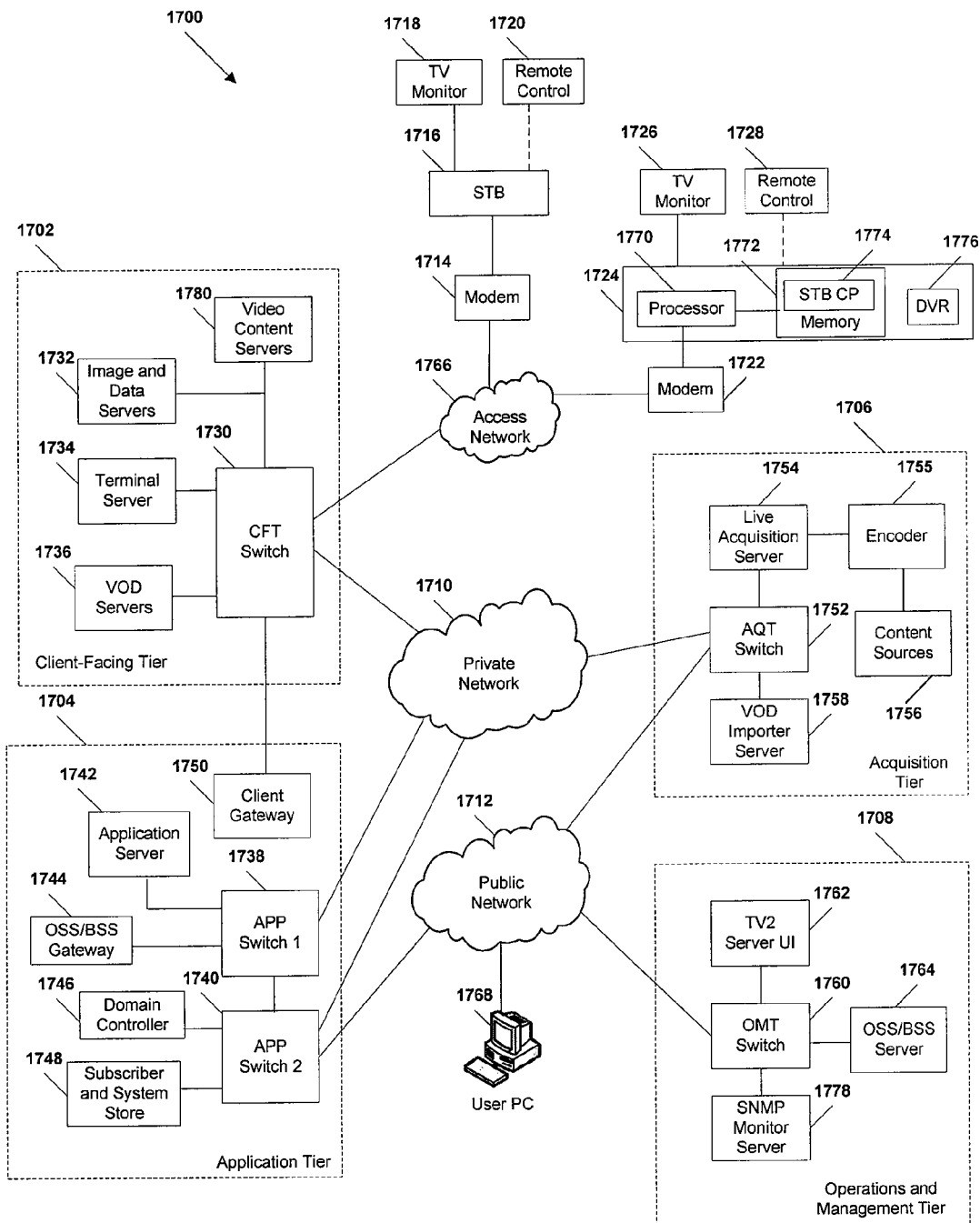
FIG. 17 is a block diagram of an IPTV system in which the content system of FIG. 1 may be deployed in accordance with an example embodiment.

FIG. 17 illustrates an example embodiment of an Internet Protocol Television (IPTV) system 1700 in which the content system 100 (see FIG. 1) may be deployed. However, the content system 100 may be deployed in other types of IPTV and non-IPTV video systems.

The system 1700 as illustrated may include a client facing tier 1702, an application tier 1704, an acquisition tier 1706, and an operations and management tier 1708. Some tiers 1702, 1704, 1706, 1708 may be coupled to a private network 1710; to a public network 1712, such as the Internet; or to both the private network 1710 and the public network 1712. For example, the client-facing tier 1702 may be coupled to the private network 1710. Further, the application tier 1704 may be coupled to the private network 1710 and to the public network 1712. The acquisition tier 1706 may also be coupled to the private network 1710 and to the public network 1712. Additionally, the operations and management tier 1708 may be coupled to the public network 1712.

As illustrated in FIG. 17, some of the various tiers 1702, 1704, 1706, 1708 may communicate with each other via the private network 1710 and the public network 1712. For instance, the client-facing tier 1702 may communicate with the application tier 1704 and the acquisition tier 1706 via the private network 1710. The application tier 1704 may also communicate with the acquisition tier 1706 via the private network 1710. Further, the application tier 1704 may communicate with the acquisition tier 1706 and the operations and management tier 1708 via the public network 1712. Moreover, the acquisition tier 1706 may communicate with the operations and management tier 1708 via the public network 1712.

As illustrated in FIG. 17, the client-facing tier 1702 may communicate with user equipment via a private access network 1766 (e.g., the provider network 104 of FIG. 1), such as an Internet Protocol Television (IPTV) access network. In an illustrative embodiment, modems, such as a first modem 1714 and a second modem 1722 may be coupled to the private access network 1766. The client-facing tier 1702 may communicate with a first representative set-top box device 1716 via the first modem 1714 and with a second representative set-top box device 1724 via the second modem 1722. The client-facing tier 1702 may communicate with a large number of set-top boxes, such as the representative set-top boxes 1716, 1724, (e.g., the access device 102 of FIG. 1) over a wide geographic area, such as a regional area, a metropolitan area, a viewing area, a designated market area or any other suitable geographic area, market area, or subscriber or customer group that may be supported by networking the client-facing tier 1702 to numerous set-top box devices. In an illustrative embodiment, the client-facing tier, or any portion thereof, may be included at a video head-end office.

In a particular embodiment, the client-facing tier 1702 may be coupled to the modems 1714, 1722 via fiber optic cables. Alternatively, the modems 1714 and 1722 may be digital subscriber line (DSL) modems that are coupled to one or more network nodes via twisted pairs, and the client-facing tier 1702 may be coupled to the network nodes via fiber-optic cables. Each set-top box device 1716, 1724 may process data received via the private access network 1766, via an IPTV software platform, such as Microsoft® TV IPTV Edition. In another embodiment, representative set-top boxes 1716, 1724 may receive data from private access network 1766 through RF and other cable and/or satellite based networks.

Additionally, the first set-top box device 1716 may be coupled to a first external display device, such as a first television monitor 1718, and the second set-top box device 1724 may be coupled to a second external display device, such as a second television monitor 1726. Moreover, the first set-top box device 1716 may communicate with a first remote control 1720, and the second set-top box device may communicate with a second remote control 1728.

In an example, non-limiting embodiment, one or more of set-top box devices 1716, 1724 may receive video content, which may include video and audio portions, from the client-facing tier 1702 via the private access network 1766. The set-top boxes 1716, 1724 may transmit the video content to an external display device, such as the television monitors 1718, 1726. Further, some of the set-top box devices 1716, 1724 may include a STB processor, such as STB processor 1770, and a STB memory device, such as STB memory 1772, which is accessible to the STB processor 1770. In one embodiment, a computer program, such as the STB computer program 1774, may be embedded within the STB memory device 1772. Some set-top box devices 1716, 1724 may also include a video content storage module, such as a digital video recorder (DVR) 1776. In a particular embodiment, the set-top box devices 1716, 1724 may communicate commands received from the remote control devices 1720, 1728 to the client-facing tier 1702 via the private access network 1766.

In an illustrative embodiment, the client-facing tier 1702 may include a client-facing tier (CFT) switch 1730 that manages communication between the client-facing tier 1702 and the private access network 1766 and between the client-facing tier 1702 and the private network 1710. As shown, the CFT switch 1730 is coupled to one or more image and data servers 1732 that store still images associated with programs of various IPTV channels. The image and data servers 1732 may also store data related to various channels, e.g., types of data related to the channels and to programs or video content displayed via the channels. In an illustrative embodiment, the image and data servers 1732 may be a cluster of servers, some of which may store still images, channel and program-related data, or any combination thereof. The CFT switch 1730 may also be coupled to a terminal server 1734 that provides terminal devices with a connection point to the private network 1710. In a particular embodiment, the CFT switch 1730 may also be coupled to one or more video-on-demand (VOD) servers 1736 that store or provide VOD content imported by the IPTV system 1700. In an illustrative, non-limiting embodiment, the VOD content servers 1780 may include one or more unicast servers.

The client-facing tier 1702 may also include one or more video content servers 1780 that transmit video content requested by viewers via their set-top boxes 1716, 1724. In an illustrative, non-limiting embodiment, the video content servers 1780 may include one or more multicast servers.

As illustrated in FIG. 17, the application tier 1704 may communicate with both the private network 1710 and the public network 1712. The application tier 1704 may include a first application tier (APP) switch 1738 and a second APP switch 1740. In a particular embodiment, the first APP switch 1738 may be coupled to the second APP switch 1740. The first APP switch 1738 may be coupled to an application server 1742 and to an OSS/BSS gateway 1744. In a particular embodiment, the application server 1742 may provide applications to the set-top box devices 1716, 1724 via the private access network 1766, which enable the set-top box devices 1716, 1724 to provide functions, such as display, messaging, processing of IPTV data and VOD material, etc. In a particular embodiment, the OSS/BSS gateway 1744 includes operation systems and support (OSS) data, as well as billing systems and support (BSS) data. In one embodiment, the OSS/BSS gateway may provide or restrict access to an OSS/BSS server 1764 that stores operations and billing systems data.

Further, the second APP switch 1740 may be coupled to a domain controller 1746 that provides web access, for example, to users via the public network 1712. For example, the domain controller 1746 may provide remote web access to IPTV account information via the public network 1712, which users may access using their personal computers 1768. The second APP switch 1740 may be coupled to a subscriber and system store 1748 that includes account information, such as account information that is associated with users who access the system 1700 via the private network 1710 or the public network 1712. In a particular embodiment, the application tier 1704 may also include a client gateway 1750 that communicates data directly with the client-facing tier 1702. In this embodiment, the client gateway 1750 may be coupled directly to the CFT switch 1730. The client gateway 1750 may provide user access to the private network 1710 and the tiers coupled thereto.

In a particular embodiment, the set-top box devices 1716, 1724 may access the IPTV system 1700 via the private access network 1766, using information received from the client gateway 1750. In this embodiment, the private access network 1766 may provide security for the private network 1710. User devices may access the client gateway 1750 via the private access network 1766, and the client gateway 1750 may allow such devices to access the private network 1710 once the devices are authenticated or verified. Similarly, the client gateway 1750 may prevent unauthorized devices, such as hacker computers or stolen set-top box devices from accessing the private network 1710, by denying access to these devices beyond the private access network 1766.

For example, when the first representative set-top box device 1716 accesses the system 1700 via the private access network 1766, the client gateway 1750 may verify subscriber information by communicating with the subscriber and system store 1748 via the private network 1710, the first APP switch 1738, and the second APP switch 1740. Further, the client gateway 1750 may verify billing information and status by communicating with the OSS/BSS gateway 1744 via the private network 1710 and the first APP switch 1738. In one embodiment, the OSS/BSS gateway 1744 may transmit a query across the first APP switch 1738, to the second APP switch 1740, and the second APP switch 1740 may communicate the query across the public network 1712 to the OSS/BSS server 1764. After the client gateway 1750 confirms subscriber and/or billing information, the client gateway 1750 may allow the set-top box device 1716 access to IPTV content and VOD content. If the client gateway 1750 is unable to verify subscriber information for the set-top box device 1716, e.g., because it is connected to an unauthorized twisted pair, the client gateway 1750 may block transmissions to and from the set-top box device 1716 beyond the private access network 1766.

As indicated in FIG. 17, the acquisition tier 1706 includes an acquisition tier (AQT) switch 1752 that communicates with the private network 1710. The AQT switch 1752 may also communicate with the operations and management tier 1708 via the public network 1712. In a particular embodiment, the AQT switch 1752 may be coupled to a live acquisition server 1754 that receives television or movie content, for example, from content sources 1756 through an encoder 1755. In a particular embodiment during operation of the IPTV system, the live acquisition server 1754 may acquire television or movie content. The live acquisition server 1754 may transmit the television or movie content to the AQT switch 1752 and the AQT switch 1752 may transmit the television or movie content to the CFT switch 1730 via the private network 1710.

Further, the television or movie content may be transmitted to the video content servers 1780, where it may be encoded, formatted, stored, or otherwise manipulated and prepared for communication to the set-top box devices 1716, 1724. The CFT switch 1730 may communicate the television or movie content to the modems 1714, 1722 via the private access network 1766. The set-top box devices 1716, 1724 may receive the television or movie content via the modems 1714, 1722, and may transmit the television or movie content to the television monitors 1718, 1726. In an illustrative embodiment, video or audio portions of the television or movie content may be streamed to the set-top box devices 1716, 1724.

Further, the AQT switch may be coupled to a video-on-demand importer server 1758 that stores television or movie content received at the acquisition tier 1706 and communicates the stored content to the VOD server 1736 at the client-facing tier 1702 via the private network 1710. Additionally, at the acquisition tier 1706, the video-on-demand (VOD) importer server 1758 may receive content from one or more VOD sources outside the IPTV system 1700, such as movie studios and programmers of non-live content. The VOD importer server 1758 may transmit the VOD content to the AQT switch 1752, and the AQT switch 1752, in turn, may communicate the material to the CFT switch 1730 via the private network 1710. The VOD content may be stored at one or more servers, such as the VOD server 1736.

When user issue requests for VOD content via the set-top box devices 1716, 1724, the requests may be transmitted over the private access network 1766 to the VOD server 1736, via the CFT switch 1730. Upon receiving such requests, the VOD server 1736 may retrieve the requested VOD content and transmit the content to the set-top box devices 1716, 1724 across the private access network 1766, via the CFT switch 1730. The set-top box devices 1716, 1724 may transmit the VOD content to the television monitors 1718, 1726. In an illustrative embodiment, video or audio portions of VOD content may be streamed to the set-top box devices 1716, 1724.

FIG. 17 further illustrates that the operations and management tier 1708 may include an operations and management tier (OMT) switch 1760 that conducts communication between the operations and management tier 1708 and the public network 1712. In the embodiment illustrated by FIG. 17, the OMT switch 1760 is coupled to a TV2 server 1762. Additionally, the OMT switch 1760 may be coupled to an OSS/BSS server 1764 and to a simple network management protocol (SNMP) monitor 1778 that monitors network devices within or coupled to the IPTV system 1700. In a particular embodiment, the OMT switch 1760 may communicate with the AQT switch 1752 via the public network 1712.

In an illustrative embodiment, the live acquisition server 1754 may transmit the television or movie content to the AQT switch 1752, and the AQT switch 1752, in turn, may transmit the television or movie content to the OMT switch 1760 via the public network 1712. In this embodiment, the OMT switch 1760 may transmit the television or movie content to the TV2 server 1762 for display to users accessing the user interface at the TV2 server 1762. For example, a user may access the TV2 server 1762 using a personal computer (PC) 1768 coupled to the public network 1712.

Figure 18:
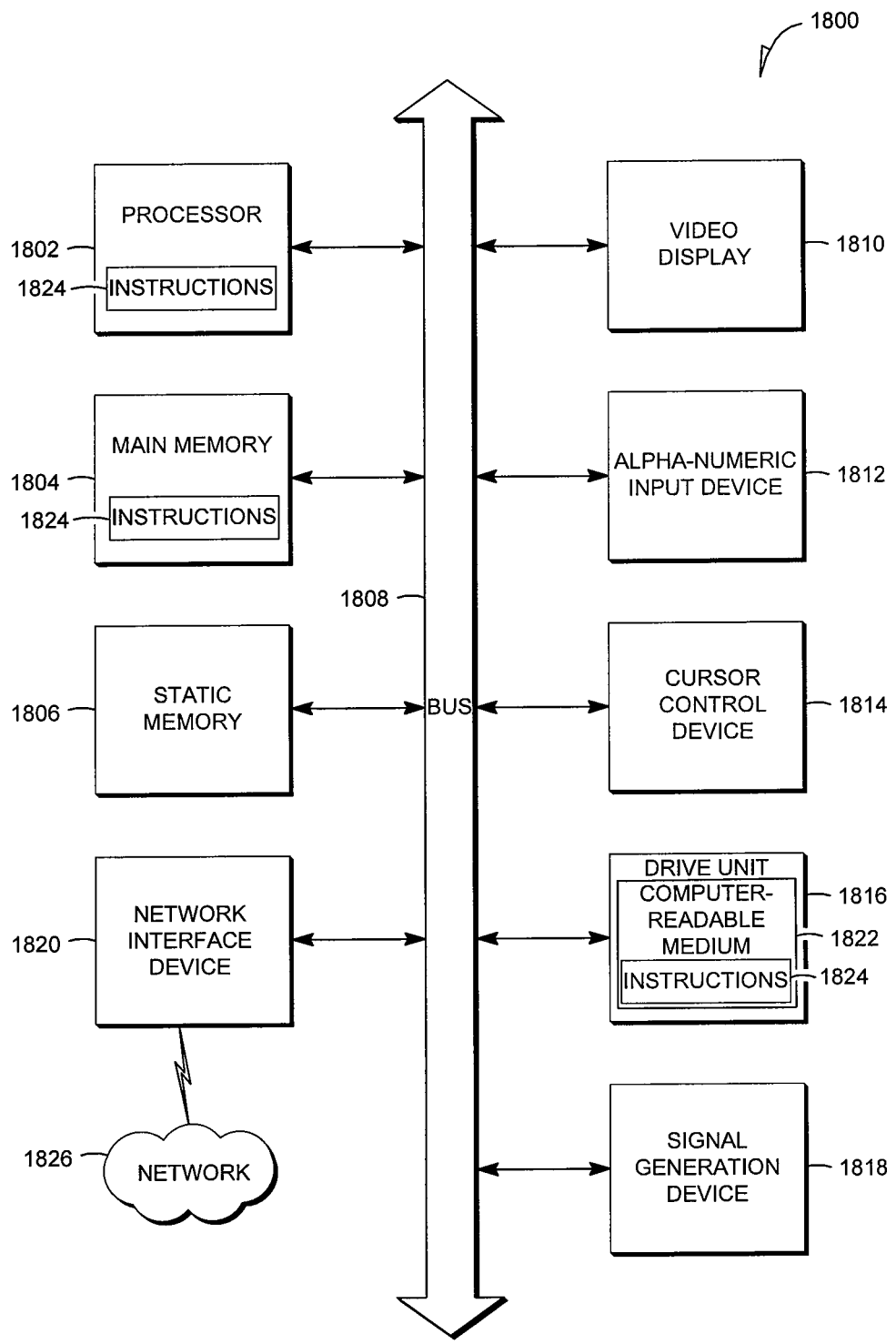
FIG. 18 illustrates a diagrammatic representation of a machine in the example form of a computer system within which a set of instructions for causing the machine to perform any one or more of the methodologies discussed herein may be executed.

FIG. 18 shows a diagrammatic representation of a machine in the example form of a computer system 1800 within which a set of instructions may be executed causing the machine to perform any one or more of the methods, processes, operations, or methodologies discussed herein. The content processing server 108, the database 114, the translation server 126, the language approval server 128, and/or the language replacement server 130 may be deployed on the computer system 1800. The access device 102, the caption device 110, and/or the remote control 112 may include the functionality of the computer system 1800.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU) a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a cursor control device 1814 (e.g., a mouse), a drive unit 1816, a signal generation device 1818 (e.g., a speaker) and a network interface device 1820.

The drive unit 1816 includes a machine-readable medium 1822 on which is stored one or more sets of instructions (e.g., software 1824) embodying any one or more of the methodologies or functions described herein. The software 1824 may also reside, completely or at least partially, within the main memory 1804 and/or within the processor 1802 during execution thereof by the computer system 1800, the main memory 1804 and the processor 1802 also constituting machine-readable media.

The software 1824 may further be transmitted or received over a network 1826 via the network interface device 1820.

While the machine-readable medium 1822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for closed caption processing have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    accessing a source signal, the source signal including a video signal and closed caption information embedded within the video signal;
    extracting the closed caption information from the source signal;
    determining additional information associated with the video signal;
    accessing the additional information from an information source over the Internet;
    utilizing a server for analyzing the video signal to determine first positional information associated with images of video content;
    utilizing the server for writing a positional information packet identification associated with a video stream in accordance with the analyzing of the video signal and the determined first positional information, wherein the positional information packet identification identifies positions in the images determined by the server that accommodate placing an additional graphic overlay;
    receiving a content request over a network from an end user access device;
    accessing a caption setting associated with the end user access device;
    providing the video signal in the video stream over the network to the end user access device for presentation on a display device in communication with the end user access device;
    providing the additional information to the end user access device over the network for presentation in the additional graphic overlay of the video signal;
    providing the positional information packet identification to the end user access device over the network; and
    providing the closed caption information in a caption stream to the end user access device over the network in accordance with the accessing of the caption setting, the closed caption information being configured for translation into a target language by the end user access device to generate translated closed caption information in accordance with the accessing of the caption setting,
wherein the video signal is configured for an analysis by the end user access device to determine second positional information associated with the images of the video content, the second positional information indicating positions in the images determined by the end user access device that accommodate placing the additional graphic overlay,
wherein the additional graphic overlay is configured for presentation with respect to the video signal at the display device in accordance with the positional information packet identification and the second positional information.

2. The method of claim 1, wherein the end user access device is a mobile device in wireless communication with the display device, and wherein the translated closed caption information is configured for presentation at the mobile device without being presented at the display device.

3. The method of claim 2, wherein the translated closed caption information is configured for presentation at the mobile device without the video content being presented at the mobile device.

4. The method of claim 1, wherein the translated closed caption information is generated based in part on:
dialect information associated with a user of the end user access device.

5. The method of claim 1, wherein the translated closed caption information is configured for presentation in the additional graphic overlay.

6. The method of claim 1, further comprising:
receiving word identification of a blocking word; and
associating the blocking word with the access device;
wherein the providing the closed caption information is in accordance with the associating of the blocking word and the accessing of the caption setting.

7. The method of claim 1, further comprising:
identifying a word of the closed caption information for replacement in accordance with the receiving of the content request and the accessing of the caption setting;
providing the word over a network to a language replacement server; and
receiving a replacement word for the word over the network from the language replacement server,
wherein the providing of the closed caption information is in accordance with the accessing of the caption setting and the receiving of the replacement word.

8. The method of claim 1, wherein the end user access device is a mobile device in wireless communication with a set top box, and wherein the translated closed caption information is configured for transmission from the mobile device to the set top box for application of word filtering by the set top box.

9. The method of claim 1, wherein the closed caption information and the video signal are configured for synchronization to be performed by the end user access device.

10. A method comprising:
accessing a caption display preference;
providing a content request to a server;
receiving, in accordance with the content request, a video stream including a video signal;
receiving a caption stream including caption information in accordance with the content request;
utilizing an end user access device for translating the caption information into a target language to generate translated closed caption information;
utilizing the end user access device for synchronizing the video stream and the caption stream;
receiving additional information associated with the video signal, the additional information being accessible via a website over the Internet;
receiving positional information packet identification associated with an analysis of images of the video signal by the server, wherein the positional information packet identification identifies a position in the images determined by the server for placing a graphic overlay and an additional graphic overlay;
utilizing the end user access device for analyzing the video signal to determine second positional information associated with the images of the video signal, the second positional information indicating positions in the images determined by the end user access device that accommodate placing the additional graphic overlay;
providing the video signal for presentation;
providing the translated caption information for presentation in the graphic overlay of the video signal in accordance with the caption display preference; and
providing the additional information in the additional graphic overlay with respect to the video signal in accordance with the positional information packet identification and the second positional information.

11. The method of claim 10, wherein the translated caption information is provided for presentation in the graphic overlay of the video signal in accordance with the positional information packet identification.

12. The method of claim 10, wherein the translated caption information is provided by the end user access device to a display device for presentation in the graphic overlay of the video signal, wherein the end user access device is a mobile device in wireless communication with the display device, and wherein the translated caption information is configured for presentation at the display device without being presented at the mobile device.

13. The method of claim 10, further comprising:
receiving identification of a blocking word; and
utilizing the end user access device for removing the blocking word from the translated caption information.

14. The method of claim 13, further comprising:
receiving a user identification associated with the identification of the blocking word; and
identifying a user associated with the providing of the content request.

15. The method of claim 13, wherein the caption display preference includes a caption color, a caption screen location, a caption transparency, a caption size, a caption language, or combinations thereof.

16. The method of claim 10, wherein the video signal, the translated caption information in the graphic overlay, and the additional graphic overlay are presented at the end user access device, wherein the end user access device is a mobile device in wireless communication with a display device, and further comprising:
providing the video signal to the display device without providing the translated caption information in the graphic overlay and the additional graphic overlay to the display device.

17. The method of claim 10, wherein the translated caption information is generated based in part on dialect information associated with a user of the end user access device.

18. The method of claim 10, wherein the video signal, the translated caption information in the graphic overlay, and the additional graphic overlay are presented at the end user access device, wherein the end user access device is a mobile device in wireless communication with a set top box, and further comprising:
providing the video signal, the translated caption information in the graphic overlay, and the additional graphic overlay to the set top box for presentation at a display device, wherein the set top box applies a word filter to the translated caption information prior to presentation at the display device.

19. A method comprising:
accessing a video signal;
extracting closed caption information embedded within the video signal;
providing a screen region selection display for presentation on a display device, the screen region selection display comprising a plurality of available screen sectors of the display device for presentation of the closed caption information;
accessing a screen region designation associated with a receiver of the video signal, the screen region designation including designation of a sector of the plurality of available screen sectors of the display device;
providing the video signal for presentation on the display device;
providing additional information for presentation with respect to the video signal on the display device in an additional graphic overlay of the video signal in accordance with a positional information packet identification and second positional information, the additional information being accessible from a website over the Internet, the positional information packet information being provided by a content server, the second positional information being determined based on an analysis by an end user access device of positions in images of the video signal that accommodate placing the additional graphic overlay; and
providing the closed caption information to the receiver for translating the closed caption information at the receiver into a target language to generate translated closed caption information.

20. The method of claim 19, wherein the receiver is a mobile device in wireless communication with the display device, and wherein the translated closed caption information is configured for presentation at the mobile device without being presented at the display device and without the images of the video signal being presented by the mobile device.

21. A non-transitory machine-readable medium comprising instructions, which when implemented by a processor cause the processor to perform operations comprising:
accessing a source signal, the source signal including a video signal and closed caption information embedded within the video signal;
extracting the closed caption information from the source signal;
receiving a content request from an end user access device;
accessing a caption setting associated with the end user access device;
providing the video signal in a video stream to the end user access device;
providing the closed caption information in a caption stream in accordance with accessing of the caption setting, wherein the closed caption information is configured for translation into a target language by the end user access device to generate translated closed caption information in accordance with the accessing of the caption setting; and
providing additional information for presentation with respect to the video signal in an additional graphic overlay of the video signal in accordance with a positional information packet identification, the additional information being accessible from an information source over the Internet, the positional information packet information being determined based on an analysis of positions in images of the video signal for placing the additional graphic overlay, wherein the closed caption information is configured for presentation in the additional graphic overlay by at least one of the end user access device or a display device in communication with the end user access device.

22. The non-transitory machine-readable medium of claim 21, wherein the end user access device is a mobile device in wireless communication with the display device, and wherein the translated closed caption information is configured for presentation at the mobile device without being presented at the display device and without the images of the video signal being presented by the mobile device.

23. A non-transitory machine-readable medium comprising instructions, which when implemented by a processor cause the processor to perform operations comprising:
accessing a caption display preference;
providing a content request to a server;
receiving a video stream including a video signal in accordance with the content request;
receiving a caption stream including caption information in accordance with the content request;
utilizing an end user access device for translating the caption information into a target language to generate translated closed caption information;
utilizing the end user access device for synchronizing the video stream and the caption stream; and
providing the video signal for presentation;
providing additional information for presentation with respect to the video signal in an additional graphic overlay of the video signal in accordance with a positional information packet identification and second positional information, the additional information being accessible from a website over the Internet, the positional information packet information being determined based on an analysis of positions in images of the video signal by the server for placing the additional graphic overlay, the second positional information being determined by utilizing the end user access device for analyzing the video signal, the second positional information indicating positions in the images determined by the end user access device that accommodate placing the additional graphic overlay; and
providing the caption information for presentation in a graphic overlay of the video signal in accordance with the caption display preference and the positional information packet identification.

24. The non-transitory machine-readable medium of claim 23 further comprising instructions, wherein the operations further comprise receiving a request for the additional information.

25. A system comprising:
a signal source access circuit to access a source signal, the source signal including a video signal and closed caption information embedded within the video signal;
a closed caption information extraction circuit to extract the closed caption information from the source signal;
a content request receiver circuit to receive a content request from an end user access device;

a caption setting access circuit to access a caption setting associated with the end user access device;

a video signal provider circuit to provide the video signal in a video stream to the end user access device;

a positional information circuit for analyzing the video signal, generating a positional information packet identification, and providing the positional information packet identification to the access device, wherein the positional information packet identification identifies a position in images of the video signal that accommodates placing the closed captioned information and additional information;

a closed caption information provider circuit to provide the closed caption information in a caption stream in accordance with accessing of the caption setting and the positional information packet identification, wherein the closed caption information is configured for translation into a target language by the end user access device to generate translated closed caption information in accordance with the accessing of the caption setting; and an additional information circuit for determining the additional information associated with the signal and providing the additional information to the access device for presentation with respect to the video signal in accordance with the positional information packet identification.

* * * * *